(12) United States Patent
Abdellatif et al.

(10) Patent No.: US 11,679,875 B2
(45) Date of Patent: *Jun. 20, 2023

(54) MECHANISM FOR DOCKING A MAGNETIC CRAWLER INTO A UAV

(71) Applicants: Saudi Arabian Oil Company, Dhahran (SA); KING ABDULLAH UNIVERSITY OF SCIENCE AND TECHNOLOGY, Thuwal (SA)

(72) Inventors: Fadl Abdellatif, Thuwal (SA); Ahmed Al Brahim, Thuwal (SA); Hesham A. Jifri, Thuwal (SA); Sahejad Patel, Thuwal (SA); Amjad Felemban, Thuwal (SA); Ali J. Alrasheed, Thuwal (SA); Jeff S. Shamma, Thuwal (SA)

(73) Assignees: Saudi Arabian Oil Company, Dhahran (SA); King Abdullah University Of Science and Technology, Thuwal (SA)

( * ) Notice: Subject to any disclaimer, the term of this patent is extended or adjusted under 35 U.S.C. 154(b) by 336 days.

This patent is subject to a terminal disclaimer.

(21) Appl. No.: 17/111,297

(22) Filed: Dec. 3, 2020

(65) Prior Publication Data
US 2022/0177125 A1 Jun. 9, 2022

(51) Int. Cl.
*B64C 39/02* (2023.01)
*B64D 9/00* (2006.01)
(Continued)

(52) U.S. Cl.
CPC ............ *B64C 39/024* (2013.01); *B64D 9/00* (2013.01); *G01B 17/02* (2013.01); *B64U 10/13* (2023.01); *B64U 2101/00* (2023.01); *H01F 7/206* (2013.01)

(58) Field of Classification Search
CPC ............ B64C 39/024; B64C 2201/027; B64C 2201/12; B64C 2201/108; B64C 2201/18;
(Continued)

(56) References Cited

U.S. PATENT DOCUMENTS

| 2,020,001 A | * | 11/1935 | Schellenger | H01C 3/20 |
| | | | | 29/610.1 |
| 2,292,078 A | * | 8/1942 | Inman | E04B 1/342 |
| | | | | 52/80.1 |

(Continued)

FOREIGN PATENT DOCUMENTS

| CN | 107329487 A | 11/2017 |
| CN | 111585210 A | 8/2020 |

(Continued)

OTHER PUBLICATIONS

International Search Report and Written Opinion in corresponding PCT application No. PCT/US2021/072726 dated Mar. 3, 2022; 14 pages.

*Primary Examiner* — Medhat Badawi
(74) *Attorney, Agent, or Firm* — Leason Ellis LLP

(57) ABSTRACT

An unmanned aerial vehicle including a body and a docking mechanism coupled to the body is provided. The docking mechanism secures a magnetic crawler to the body during flight and during landing on a ferromagnetic cylindrical surface. The docking mechanism includes a docking hook that couples to the magnetic crawler and a linear actuator coupling the docking hook to the body. The docking hook includes passive latches that passively release the magnetic crawler from the docking hook onto the cylindrical surface after the landing, receive the magnetic crawler into the docking hook from the cylindrical surface after the releasing, and secure the magnetic crawler to the body during takeoff from the cylindrical surface after the receiving. The linear actuator lowers the docking hook and coupled magnetic crawler from the body to the cylindrical surface, and raises the docking hook and received magnetic crawler from the cylindrical surface to the body.

24 Claims, 13 Drawing Sheets

(51) Int. Cl.
    *G01B 17/02*    (2006.01)
    *H01F 7/20*     (2006.01)
    *B64U 10/13*    (2023.01)
    *B64U 101/00*   (2023.01)

(58) Field of Classification Search
    CPC .......... B64C 25/32; B64D 9/00; G01B 17/02;
                   H01F 7/206; B64U 10/13; B64U
                   2101/00; B64U 30/20; B64U 70/00
    See application file for complete search history.

(56) References Cited

U.S. PATENT DOCUMENTS

| | | | | | |
|---|---|---|---|---|---|
| 3,034,607 | A | * | 5/1962 | Haines, Jr. | E04H 6/44 52/64 |
| 3,229,649 | A | * | 1/1966 | Baker | E04H 9/10 109/1 R |
| 3,353,310 | A | * | 11/1967 | Ruhle | E04H 6/44 52/66 |
| 3,353,311 | A | * | 11/1967 | McClure | B60P 3/34 52/63 |
| 3,712,363 | A | * | 1/1973 | Thomassen | E06B 3/01 160/113 |
| 3,785,316 | A | * | 1/1974 | Leming | B64F 1/24 74/89.32 |
| 3,817,479 | A | * | 6/1974 | Crowley | B60V 1/00 244/17.11 |
| 3,818,652 | A | * | 6/1974 | Pierce | E04H 6/44 52/DIG. 14 |
| 3,823,519 | A | * | 7/1974 | Cordova | E04H 6/44 52/DIG. 14 |
| 3,893,538 | A | * | 7/1975 | Thompson | B60V 3/025 244/50 |
| 4,116,408 | A | * | 9/1978 | Soloy | B64F 1/007 244/114 R |
| 4,255,911 | A | * | 3/1981 | Beacom | E04H 6/44 52/174 |
| 4,665,857 | A | * | 5/1987 | Akerman | B63B 35/50 244/110 E |
| 4,669,683 | A | * | 6/1987 | Guillory | E01F 3/00 244/114 R |
| 4,834,321 | A | * | 5/1989 | Granger | B64F 1/125 410/12 |
| 4,883,241 | A | * | 11/1989 | Snead | B64F 1/007 105/238.1 |
| 5,067,669 | A | * | 11/1991 | Van Horn | B64F 1/007 244/114 R |
| 5,119,935 | A | * | 6/1992 | Stump | B64F 1/36 206/335 |
| 5,351,915 | A | * | 10/1994 | Aandalen | E01F 3/00 244/114 R |
| 5,367,973 | A | * | 11/1994 | Heggertveit | B63B 35/52 114/261 |
| 5,577,687 | A | * | 11/1996 | Downing | B64F 1/007 244/114 R |
| 5,950,372 | A | * | 9/1999 | Al-Sabah | F41F 3/04 89/1.8 |
| 6,079,668 | A | * | 6/2000 | Brown | B64F 1/36 244/114 R |
| 6,203,263 | B1 * | | 3/2001 | Hancock | B64F 1/22 244/50 |
| 6,758,230 | B2 * | | 7/2004 | Bogart, Jr. | E04H 6/44 52/63 |
| 6,840,480 | B2 * | | 1/2005 | Carroll | B64C 39/024 244/119 |
| 7,318,564 | B1 * | | 1/2008 | Marshall | B60L 53/11 244/12.3 |
| 7,714,536 | B1 * | | 5/2010 | Silberg | B60L 50/90 320/108 |
| 8,162,256 | B2 * | | 4/2012 | Goossen | B64F 1/04 244/114 R |
| D665,940 | S | * | 8/2012 | Lane | D26/71 |
| D666,759 | S | * | 9/2012 | Lane | D26/71 |
| 8,297,552 | B2 * | | 10/2012 | Ying | B64F 1/007 244/114 R |
| D673,318 | S | * | 12/2012 | Lane | D26/71 |
| 8,511,606 | B1 * | | 8/2013 | Lutke | B64C 39/024 320/109 |
| 8,862,288 | B2 * | | 10/2014 | Vavrina | B60L 53/80 414/373 |
| 8,899,903 | B1 * | | 12/2014 | Saad | B60L 53/34 320/109 |
| 9,033,390 | B1 * | | 5/2015 | Ksiezopolski | B60R 13/06 296/26.13 |
| 9,045,221 | B2 * | | 6/2015 | Riedinger | G05D 1/0204 |
| 9,056,676 | B1 * | | 6/2015 | Wang | B64F 1/00 |
| 9,087,451 | B1 * | | 7/2015 | Jarrell | G05D 1/101 |
| 9,359,783 | B1 * | | 6/2016 | Josdal | E04H 15/06 |
| 9,387,928 | B1 * | | 7/2016 | Gentry | B60L 53/00 |
| 9,457,916 | B2 * | | 10/2016 | McDermott | B64F 1/18 |
| 9,499,265 | B2 * | | 11/2016 | Sanz | H02J 7/0044 |
| 9,527,605 | B1 * | | 12/2016 | Gentry | B65G 51/02 |
| 9,555,898 | B2 * | | 1/2017 | Garner | B64F 1/025 |
| 9,589,448 | B1 * | | 3/2017 | Schneider | F41H 11/00 |
| 9,645,581 | B1 * | | 5/2017 | Yang | G08G 5/0069 |
| 9,650,133 | B2 * | | 5/2017 | Fisher | B64C 39/024 |
| 9,654,984 | B2 * | | 5/2017 | Priest | H04W 24/02 |
| 9,714,012 | B1 * | | 7/2017 | Hoareau | G05D 1/0202 |
| 9,725,168 | B2 * | | 8/2017 | Kim | B64D 1/22 |
| 9,764,703 | B2 * | | 9/2017 | Hoareau | B60R 16/033 |
| 9,764,836 | B1 * | | 9/2017 | Elzinga | B64C 39/024 |
| 9,764,838 | B2 * | | 9/2017 | Priest | B64C 39/024 |
| 9,810,872 | B1 * | | 11/2017 | Lish | H01B 7/40 |
| 9,815,684 | B2 * | | 11/2017 | Kamradt | B67D 7/845 |
| 9,834,305 | B2 * | | 12/2017 | Taylor | B64C 27/26 |
| 9,878,786 | B2 * | | 1/2018 | Chan | B64C 39/024 |
| 9,878,787 | B2 * | | 1/2018 | Chan | B64C 39/024 |
| 9,880,563 | B2 * | | 1/2018 | Fisher | G08G 5/0065 |
| 9,926,084 | B2 * | | 3/2018 | Peverill | G05D 1/101 |
| 9,928,749 | B2 * | | 3/2018 | Gil | B64F 1/0299 |
| 9,932,110 | B2 * | | 4/2018 | McNally | H02G 1/02 |
| 9,937,808 | B2 * | | 4/2018 | Evans | B60L 53/124 |
| 9,961,572 | B2 * | | 5/2018 | Foster | H04W 24/04 |
| 9,963,228 | B2 * | | 5/2018 | McCullough | G08G 5/025 |
| 9,975,442 | B2 * | | 5/2018 | Lee | B64D 45/08 |
| 9,975,651 | B1 * | | 5/2018 | Eck | B64C 39/024 |
| 9,977,435 | B2 * | | 5/2018 | Fisher | B64C 39/024 |
| 9,983,581 | B1 * | | 5/2018 | Husain | H04N 7/181 |
| 9,984,347 | B2 * | | 5/2018 | Dreano, Jr. | G06Q 30/0635 |
| 10,054,950 | B2 * | | 8/2018 | Carrasco Zanini | H02J 7/00 |
| 10,055,984 | B1 * | | 8/2018 | Schaeffer | G08G 1/04 |
| 10,062,048 | B2 * | | 8/2018 | High | B65D 88/12 |
| 10,065,717 | B1 * | | 9/2018 | Husain | B64C 39/024 |
| 10,065,718 | B1 * | | 9/2018 | Husain | F42B 19/00 |
| 10,090,909 | B2 * | | 10/2018 | Peitzer | H04B 17/12 |
| 10,094,546 | B2 * | | 10/2018 | Agrawal | G01D 11/245 |
| 10,099,561 | B1 * | | 10/2018 | Ananthanarayanan | B60L 53/32 |
| 10,102,757 | B2 * | | 10/2018 | Manley | G08G 5/0091 |
| 10,112,728 | B2 * | | 10/2018 | Evans | B64F 1/36 |
| 10,173,774 | B2 * | | 1/2019 | Jones | B64C 39/024 |
| 10,196,155 | B2 * | | 2/2019 | Martin | B64F 1/00 |
| 10,246,187 | B2 * | | 4/2019 | Cantrell | B64D 1/22 |
| 10,274,952 | B2 * | | 4/2019 | Cantrell | G08G 5/0008 |
| 10,442,522 | B2 * | | 10/2019 | Oldroyd | B64C 29/02 |
| 10,529,221 | B2 * | | 1/2020 | Jarrell | F21S 2/005 |
| 10,597,164 | B2 * | | 3/2020 | Oldroyd | B64C 29/02 |
| 11,097,796 | B2 * | | 8/2021 | Abdellatif | B60B 19/12 |
| 11,472,498 | B2 * | | 10/2022 | Abdellatif | G01S 17/86 |
| 2004/0256519 | A1 * | | 12/2004 | Ellis | B64F 1/02 244/110 E |
| 2005/0230537 | A1 * | | 10/2005 | Chouery | B64F 1/007 244/116 |
| 2005/0281075 | A1 * | | 12/2005 | Chen | B82Y 10/00 |
| 2008/0268404 | A1 * | | 10/2008 | Burt | G09B 19/12 434/55 |
| 2009/0050750 | A1 * | | 2/2009 | Goossen | B64C 39/024 901/14 |
| 2009/0057486 | A1 * | | 3/2009 | Becht, IV | B64F 1/007 244/114 R |

(56) References Cited

U.S. PATENT DOCUMENTS

| | | | |
|---|---|---|---|
| 2010/0140415 A1* | 6/2010 | Goossen | B64C 39/024 29/889.7 |
| 2010/0200694 A1* | 8/2010 | Tripier-Larivaud | B64F 1/007 244/114 R |
| 2010/0320313 A1* | 12/2010 | Hanafin | B64F 1/125 244/114 R |
| 2013/0134260 A1* | 5/2013 | Besenzoni | B63B 35/50 244/110 E |
| 2013/0202446 A1* | 8/2013 | Siegfriedsen | F03D 80/50 416/244 A |
| 2014/0032034 A1* | 1/2014 | Raptopoulos | H04B 7/18506 701/25 |
| 2014/0319272 A1* | 10/2014 | Casado | B60L 50/52 244/110 E |
| 2014/0332620 A1* | 11/2014 | Earon | B64D 47/08 244/119 |
| 2015/0097530 A1* | 4/2015 | Scarlatti | H02J 7/00 320/109 |
| 2015/0142169 A1* | 5/2015 | Kim | A47L 11/283 15/98 |
| 2015/0158598 A1* | 6/2015 | You | H04N 7/181 701/16 |
| 2015/0158599 A1* | 6/2015 | Sisko | B64F 1/20 244/114 R |
| 2015/0162867 A1* | 6/2015 | Meringer | F24S 30/422 362/183 |
| 2015/0175276 A1* | 6/2015 | Koster | B64F 1/32 244/114 R |
| 2015/0204561 A1* | 7/2015 | Sadwick | F24F 11/33 236/1 C |
| 2015/0336669 A1* | 11/2015 | Kantor | G08G 5/0086 701/3 |
| 2015/0339933 A1* | 11/2015 | Batla | G08G 5/0082 701/120 |
| 2015/0379874 A1* | 12/2015 | Ubhi | G01S 5/0027 701/3 |
| 2016/0122038 A1* | 5/2016 | Fleischman | B64C 39/024 244/114 R |
| 2016/0144982 A1* | 5/2016 | Sugumaran | B64C 25/32 244/108 |
| 2016/0221688 A1* | 8/2016 | Moore | H02J 7/00 |
| 2016/0280359 A1* | 9/2016 | Semke | B64C 27/006 |
| 2016/0340006 A1* | 11/2016 | Tang | B64C 39/024 |
| 2017/0021943 A1* | 1/2017 | Peverill | B64C 25/68 |
| 2017/0028863 A1* | 2/2017 | Meringer | F21S 9/035 |
| 2017/0110901 A1* | 4/2017 | Amarasekara | B64F 1/007 |
| 2017/0226705 A1* | 8/2017 | Dotlich | B64F 1/00 |
| 2017/0275025 A1* | 9/2017 | Johnson | B60L 53/16 |
| 2017/0305575 A1* | 10/2017 | Bash | B64F 1/32 |
| 2017/0320570 A1* | 11/2017 | Horn | G08G 5/0026 |
| 2017/0320572 A1* | 11/2017 | High | B64C 39/024 |
| 2018/0017679 A1* | 1/2018 | Valouch | G01S 17/06 |
| 2018/0061148 A1* | 3/2018 | Dudar | G08G 1/205 |
| 2018/0146531 A1* | 5/2018 | Rinko | F21V 23/0442 |
| 2018/0180234 A1* | 6/2018 | Spiro | H05K 1/181 |
| 2018/0257502 A1* | 9/2018 | Park | H02J 50/12 |
| 2019/0072953 A1* | 3/2019 | Maheshwari | G05D 1/0055 |
| 2019/0263530 A1* | 8/2019 | Pike | B64C 27/08 |
| 2019/0348862 A1* | 11/2019 | Obayashi | H01F 27/02 |
| 2019/0389576 A1* | 12/2019 | White, III | B64C 25/04 |
| 2020/0089206 A1* | 3/2020 | Mukherjee | H04W 4/029 |
| 2020/0132286 A1* | 4/2020 | Carlén | F21V 21/116 |
| 2020/0172232 A1* | 6/2020 | Abdellatif | B62D 57/024 |
| 2020/0174478 A1* | 6/2020 | Abdellatif | G05D 1/0094 |
| 2022/0177125 A1* | 6/2022 | Abdellatif | B64D 9/00 |

FOREIGN PATENT DOCUMENTS

| | | |
|---|---|---|
| EP | 3497016 B1 | 7/2020 |
| WO | 2019144227 A1 | 8/2019 |
| WO | 2020030919 A1 | 2/2020 |

* cited by examiner

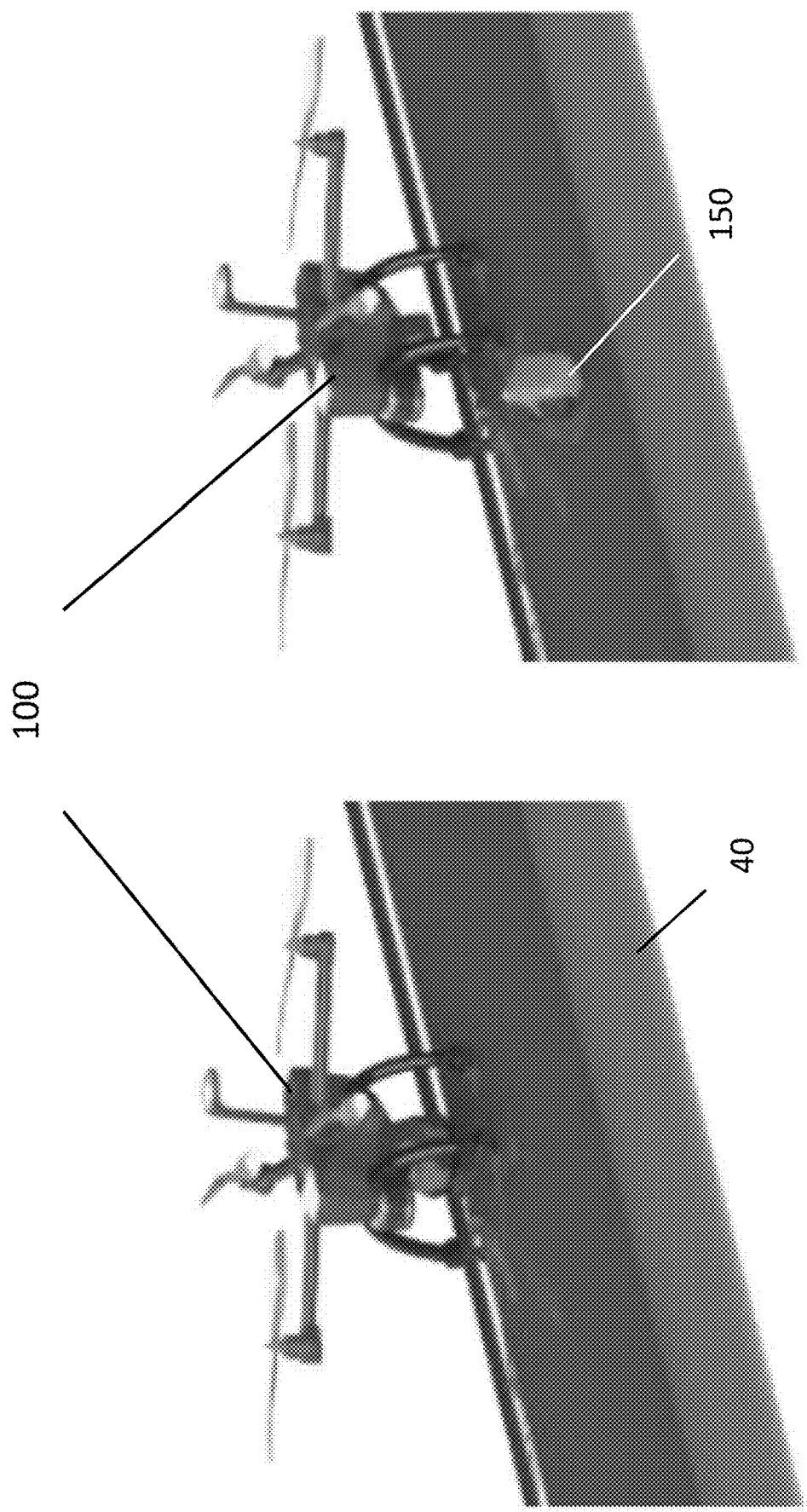

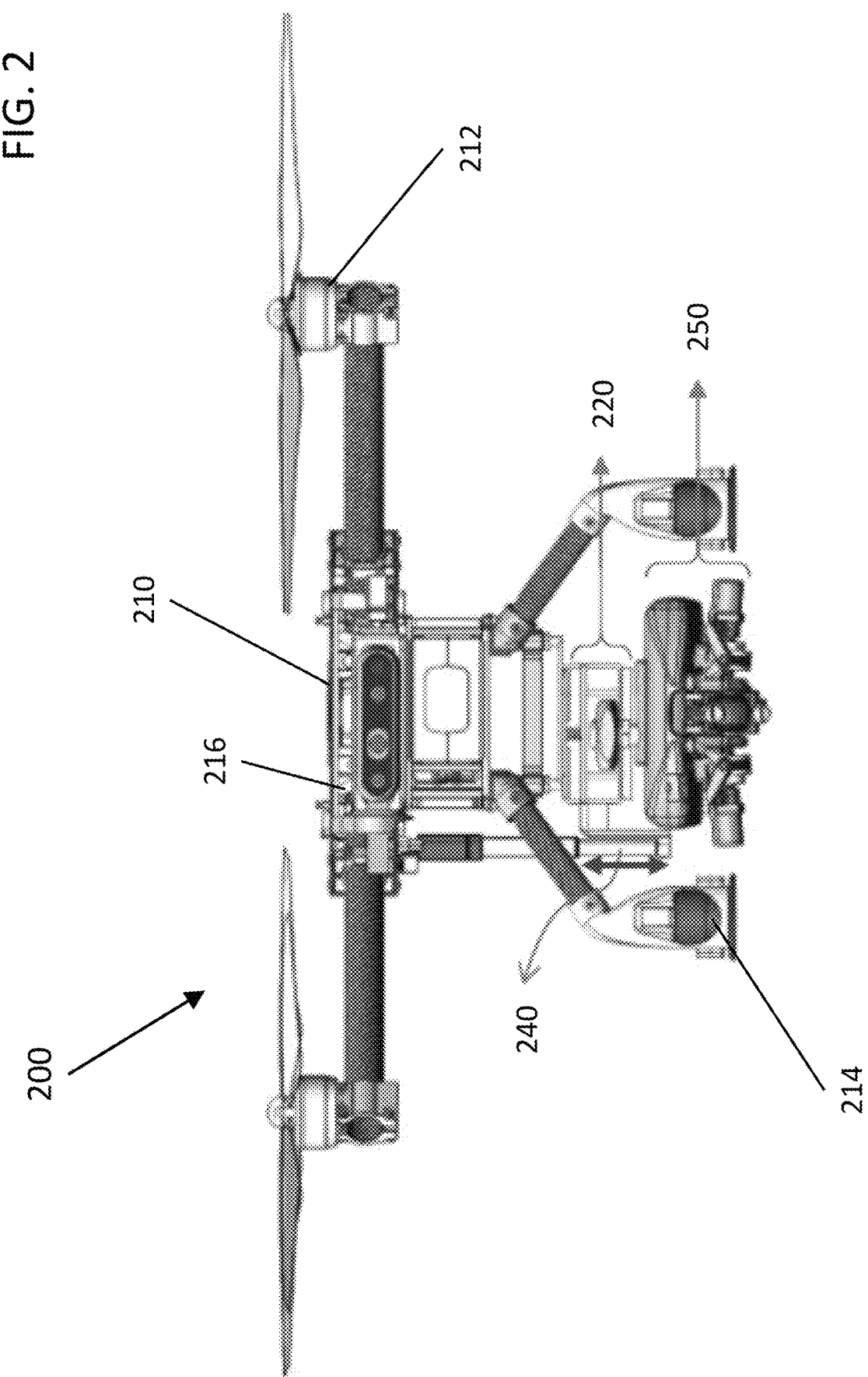

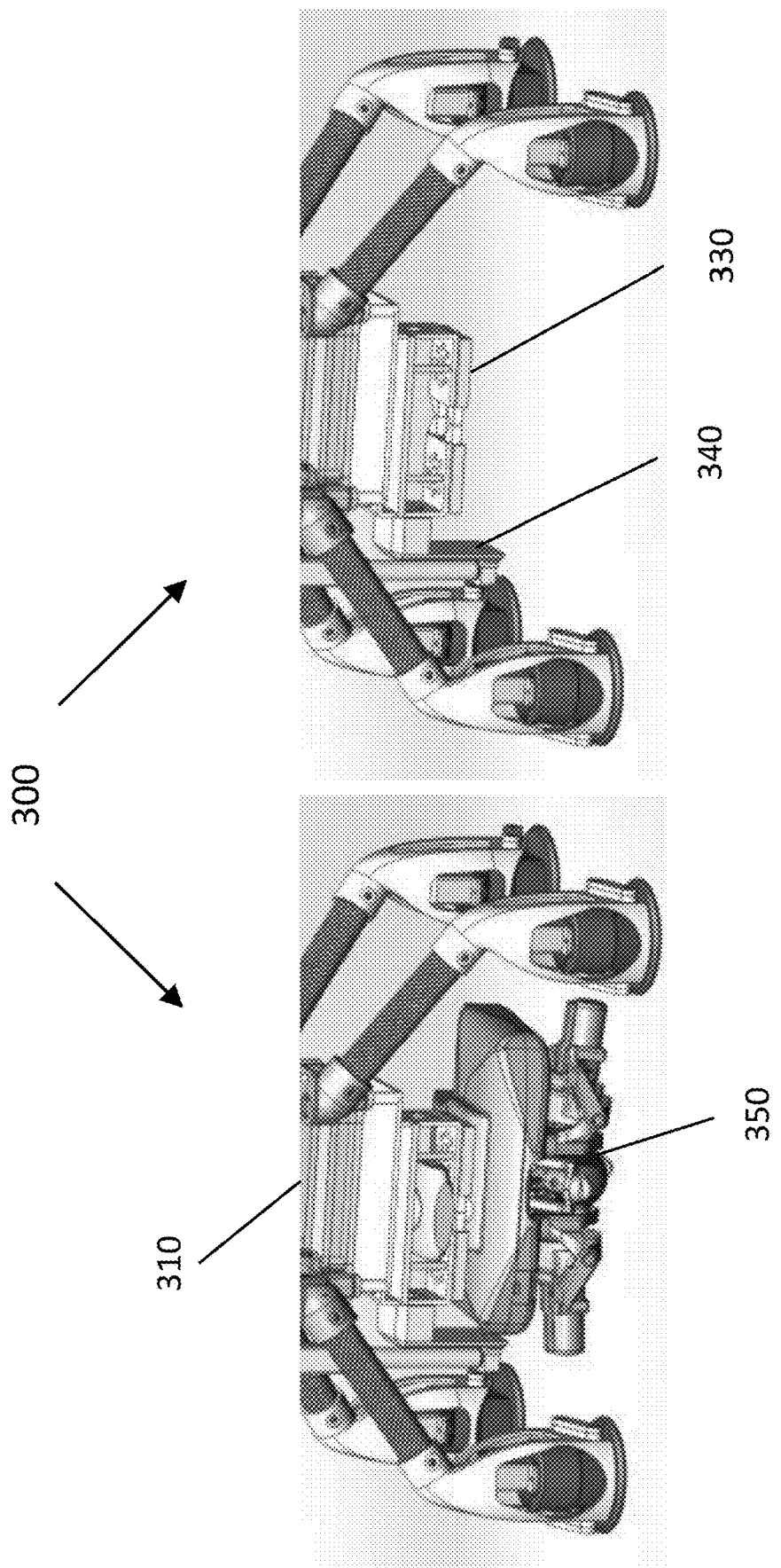

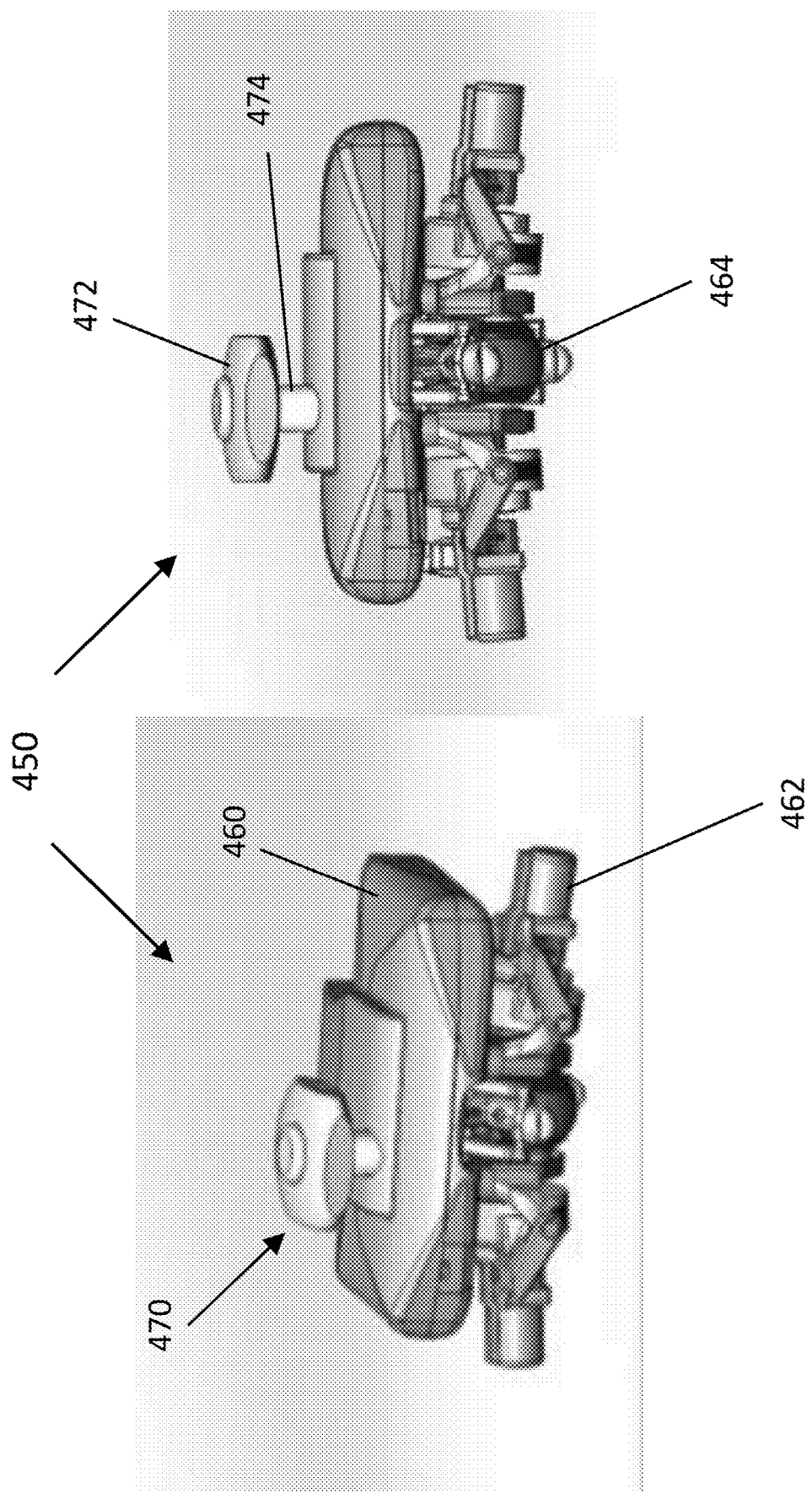

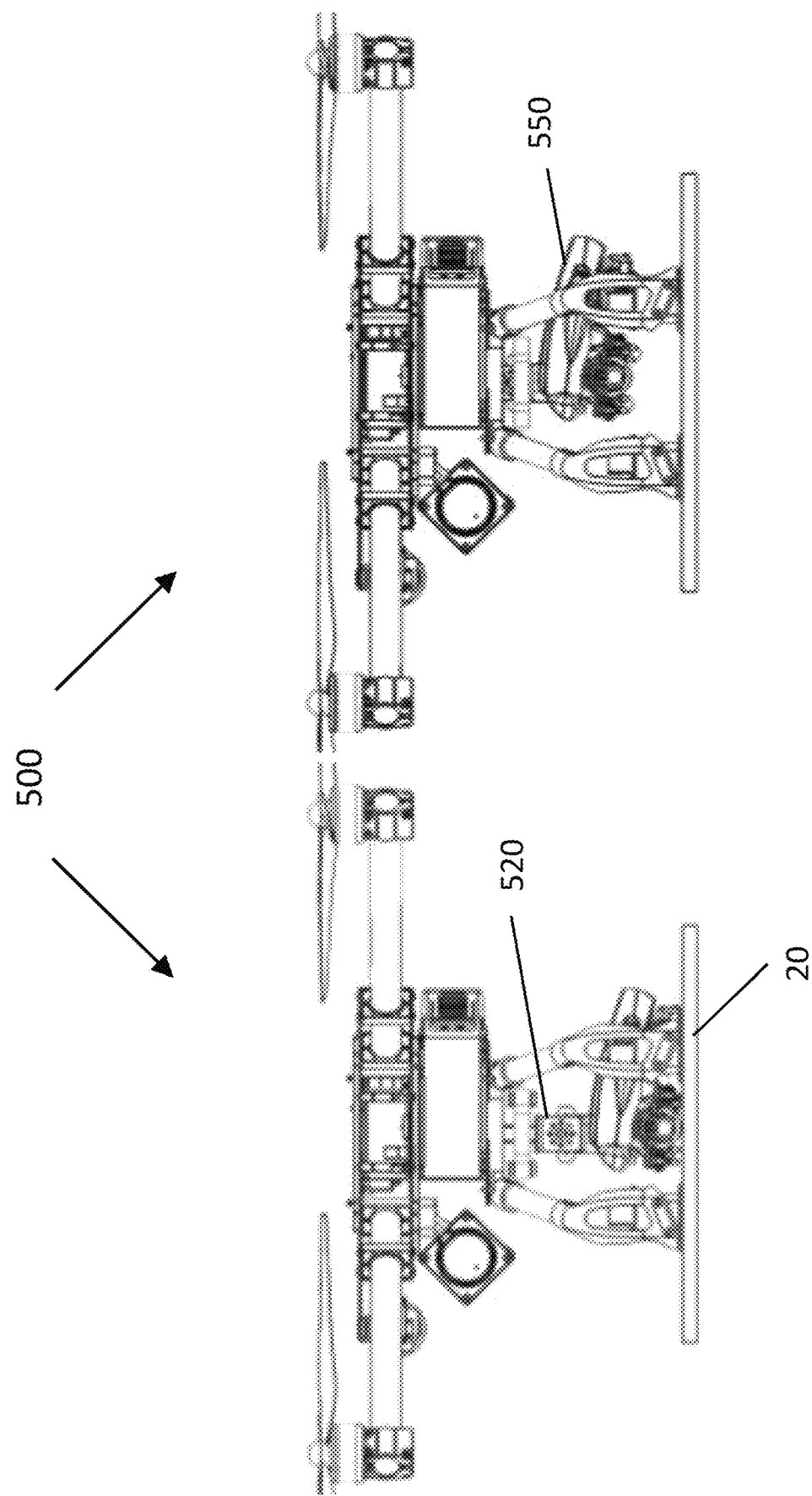

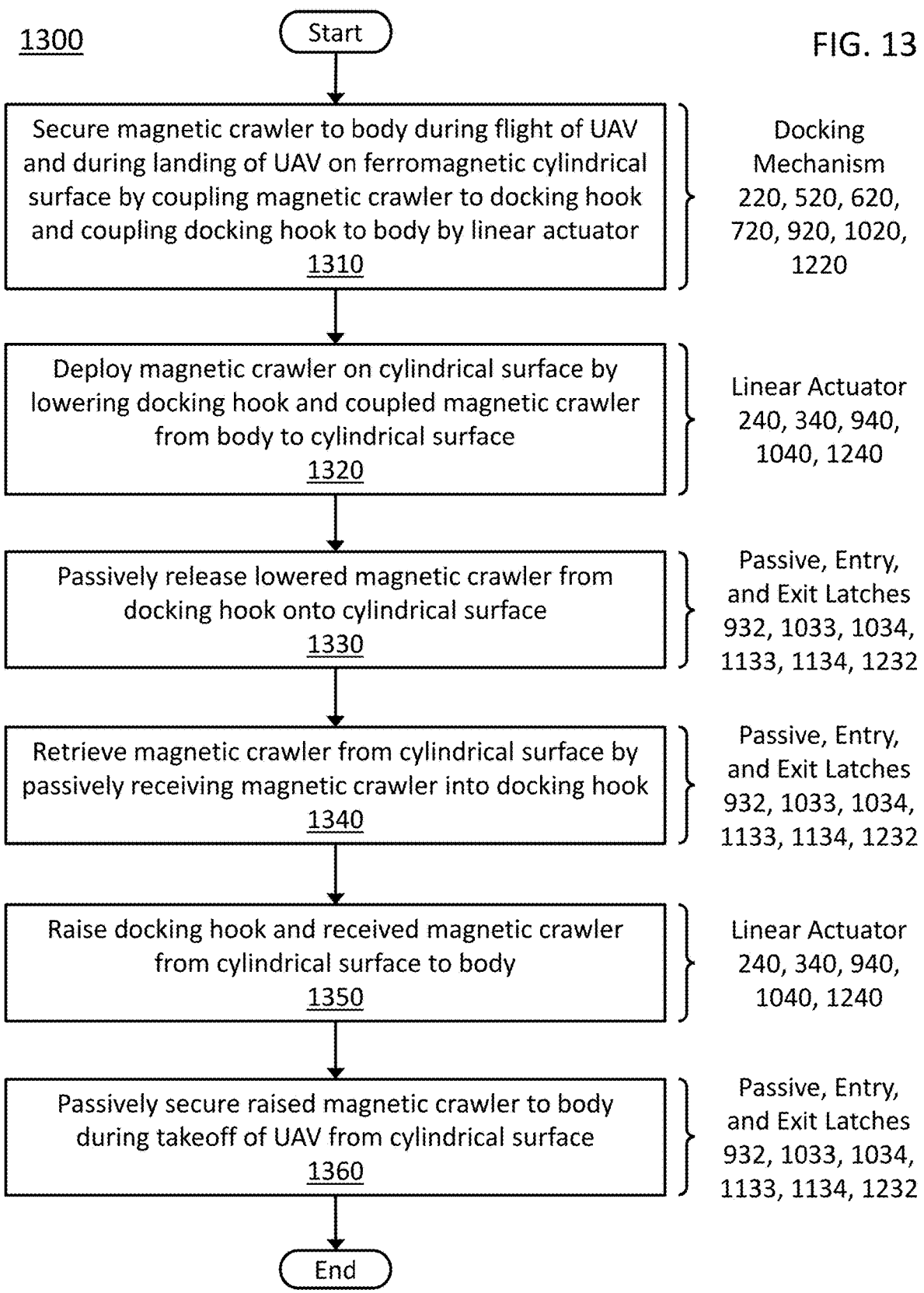

MECHANISM FOR DOCKING A MAGNETIC CRAWLER INTO A UAV

FIELD OF THE DISCLOSURE

The present disclosure relates generally to an unmanned aerial vehicle (UAV) or drone, and more specifically to a UAV having a mechanism for docking a magnetic crawler into the UAV.

BACKGROUND OF THE DISCLOSURE

One of the top challenges in the oil and gas industry is the periodic inspection of elevated assets found in refineries, gas plants, offshore platforms, and other plants and facilities. These assets include high elevation pipes and structures that are difficult to access during inspection jobs. Often, the only practical way to inspect them is to erect scaffolding in order for the inspector to access the asset and perform manual inspection. Such scaffolding is not only expensive and introduces a significant cost barrier for frequent inspection, but also poses safety concerns mainly in the form of falling and tripping hazards.

It is in regard to these and other problems in the art that the present disclosure is directed to provide a technical solution for an effective UAV having a mechanism for docking a magnetic crawler into the UAV.

SUMMARY OF THE DISCLOSURE

According to a first aspect of the disclosure, an unmanned aerial vehicle (UAV) is provided. The UAV includes a body and a docking mechanism coupled to the body. The docking mechanism is configured to secure a magnetic crawler to the body during flight of the UAV and during landing of the UAV on a ferromagnetic cylindrical surface after the flight. The docking mechanism comprises a docking hook configured to couple to the magnetic crawler. The docking hook comprises passive latches configured to passively: release the magnetic crawler from the docking hook after the landing in order to deploy the magnetic crawler on the cylindrical surface; receive the magnetic crawler into the docking hook after the deployment in order to retrieve the magnetic crawler from the cylindrical surface; and secure the magnetic crawler to the body during the flight, during the landing, and during takeoff of the UAV from the cylindrical surface after the retrieval. The docking mechanism further comprises a linear actuator coupling the docking hook to the body and configured to lower the docking hook and coupled magnetic crawler from the body to the cylindrical surface as part of the deployment, and to raise the docking hook and received magnetic crawler from the cylindrical surface to the body as part of the retrieval.

In an embodiment consistent with the above, the linear actuator is further configured to lower the docking hook and coupled magnetic crawler by magnetically attaching the magnetic crawler to the cylindrical surface, and to raise the docking hook and received magnetic crawler by magnetically detaching the magnetic crawler from the cylindrical surface.

In an embodiment consistent with the above, the magnetic crawler comprises a chassis and a docking adapter coupled to the chassis and configured to passively secure the chassis to the docking hook. The docking adapter includes: a docking knob configured to couple to the docking hook; and a docking rod coupling the docking knob to the chassis. The passive latches are further configured to passively surround a section of the docking rod during the coupling of the docking knob to the docking hook in order to passively secure the chassis to the docking hook.

In an embodiment consistent with the above, the docking rod is off-centered with respect to a gravity direction of the center of mass of the chassis.

In an embodiment consistent with the above, the docking rod is cylindrical.

In an embodiment consistent with the above, the passive latches comprise entry latches on an entry side of the docking hook and exit latches on an exit side of the docking hook opposite the entry side, the entry latches being configured to passively open and receive the magnetic crawler on the entry side as part of the retrieval and to otherwise remain passively shut, the exit latches being configured to passively open and release the magnetic crawler on the exit side as part of the deployment and to otherwise remain passively shut.

In an embodiment consistent with the above, the docking hook comprises locking pins configured to passively couple to the exit latches in order to prevent the exit latches from opening, and to passively uncouple from the exit latches when the docking hook and coupled magnetic crawler are lowered to the cylindrical surface in order to allow the exit latches to passively open and release the magnetic crawler.

In an embodiment consistent with the above, the locking pins are further configured to passively re-couple to the exit latches in order to prevent the exit latches from opening after the magnetic crawler has been released.

In an embodiment consistent with the above, the magnetic crawler comprises a chassis and a docking adapter coupled to the chassis and configured to passively secure the chassis to the docking hook. The docking adapter includes: a docking knob configured to couple to the docking hook; and a docking rod coupling the docking knob to the chassis, the entry and exit latches being further configured to passively surround a section of the docking rod and remain passively shut during the coupling of the docking knob to the docking hook in order to passively secure the chassis to the docking hook.

In an embodiment consistent with the above, the magnetic crawler comprises an ultrasonic testing (UT) thickness sensor configured to nondestructively measure a thickness of the cylindrical surface after the deployment and before the retrieval.

In an embodiment consistent with the above, the cylindrical surface is part of a carbon steel pipe or vessel.

In an embodiment consistent with the above, the UAV further comprises a control circuit coupled to the body and configured to control the linear actuator in order to control the lowering of the docking hook and coupled magnetic crawler to the cylindrical surface based on feedback from a deployment sensor.

According to another aspect of the disclosure, a method of operating an unmanned aerial vehicle (UAV) comprising a body and a docking mechanism coupled to the body is provided. The method comprises: securing, by the docking mechanism, a magnetic crawler to the body during flight of the UAV and during landing of the UAV on a ferromagnetic cylindrical surface after the flight by coupling the magnetic crawler to a docking hook of the docking mechanism and coupling the docking hook to the body by a linear actuator of the docking mechanism; deploying the magnetic crawler on the cylindrical surface after the landing by: lowering, by the linear actuator, the docking hook and coupled magnetic crawler from the body to the cylindrical surface; and passively releasing, by passive latches of the docking hook, the lowered magnetic crawler from the docking hook onto the cylindrical surface; retrieving the magnetic crawler from the cylindrical surface after the deployment by: passively receiving, by the passive latches, the magnetic crawler into the docking hook; and raising, by the linear actuator, the docking hook and received magnetic crawler from the cylindrical surface to the body; and passively securing, by the passive latches, the raised magnetic crawler to the body during takeoff of the UAV from the cylindrical surface after the retrieval.

In an embodiment consistent with the method described above, lowering the docking hook and coupled magnetic crawler comprises magnetically attaching the magnetic crawler to the cylindrical surface, and raising the docking hook and received magnetic crawler comprises magnetically detaching the magnetic crawler from the cylindrical surface.

In an embodiment consistent with the method described above, the magnetic crawler comprises a chassis and a docking adapter coupled to the chassis, the docking adapter comprises a docking knob and a docking rod coupling the docking knob to the chassis, and the method further comprises passively securing the chassis to the docking hook by coupling the docking knob to the docking hook while passively surrounding a section of the docking rod with the passive latches.

In an embodiment consistent with the method described above, the docking rod is off-centered with respect to a gravity direction of the center of mass of the chassis.

In an embodiment consistent with the method described above, the docking rod is cylindrical.

In an embodiment consistent with the method described above: the passive latches comprise entry latches on an entry side of the docking hook and exit latches on an exit side of the docking hook opposite the entry side; passively receiving the magnetic crawler comprises passively opening the entry latches and receiving the magnetic crawler on the entry side during the retrieval and otherwise maintaining passive shutting of the entry latches; and passively releasing the lowered magnetic crawler comprises passively opening the exit latches and releasing the magnetic crawler on the exit side during the deployment and otherwise maintaining passive shutting of the exit latches.

In an embodiment consistent with the method described above: the docking hook comprises locking pins; the method further comprises preventing the exit latches from opening by passively coupling the locking pins to the exit latches; and passively releasing the magnetic crawler comprises passively opening the exit latches and releasing the magnetic crawler by passively uncoupling the locking pins from the exit latches when the docking hook and coupled magnetic crawler are lowered to the cylindrical surface.

In an embodiment consistent with the method described above, the method further comprises preventing the exit latches from opening after the magnetic crawler has been released by passively re-coupling the locking pins to the exit latches.

In an embodiment consistent with the method described above, the magnetic crawler comprises a chassis and a docking adapter coupled to the chassis, the docking adapter comprises a docking knob and a docking rod coupling the docking knob to the chassis, and the method further comprises passively securing the chassis to the docking hook by coupling the docking knob to the docking hook while passively surrounding a section of the docking rod with the entry and exit latches and maintaining the passive shutting of the entry and exit latches.

In an embodiment consistent with the method described above, the magnetic crawler comprises an ultrasonic testing (UT) thickness sensor, and the method further comprises nondestructively measuring, by the UT thickness sensor, a thickness of the cylindrical surface after the deployment and before the retrieval.

In an embodiment consistent with the method described above, the cylindrical surface is part of a carbon steel pipe or vessel.

In an embodiment consistent with the method described above, the UAV further comprises a control circuit coupled to the body, and the method further comprises controlling, by the control circuit, the linear actuator to control the lowering of the docking hook and coupled magnetic crawler based on feedback from a deployment sensor.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 1A-1B illustrate an example unmanned aerial vehicle (UAV) having a docking mechanism, the UAV being shown on a pipe with a releasable magnetic crawler that is respectively attached to and detached from the UAV, according to an embodiment.

FIG. 2 is a front view of an example UAV having a docking mechanism securing a magnetic crawler to the UAV, according to an embodiment.

FIGS. 3A-3B illustrate an example UAV having a docking mechanism respectively securing and not securing a magnetic crawler, according to an embodiment.

FIGS. 4A-4B illustrate an example magnetic crawler having a docking adapter for docking with a UAV having a docking mechanism, according to an embodiment.

FIGS. 5A-5B are side views of an example UAV with a docking mechanism attached to a magnetic crawler in lowered and raised positions, respectively, according to an embodiment.

FIG. 13 is a flow diagram of an example method of operating a UAV with a docking mechanism for attaching and detaching a magnetic crawler, according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figures 6A, 6B:
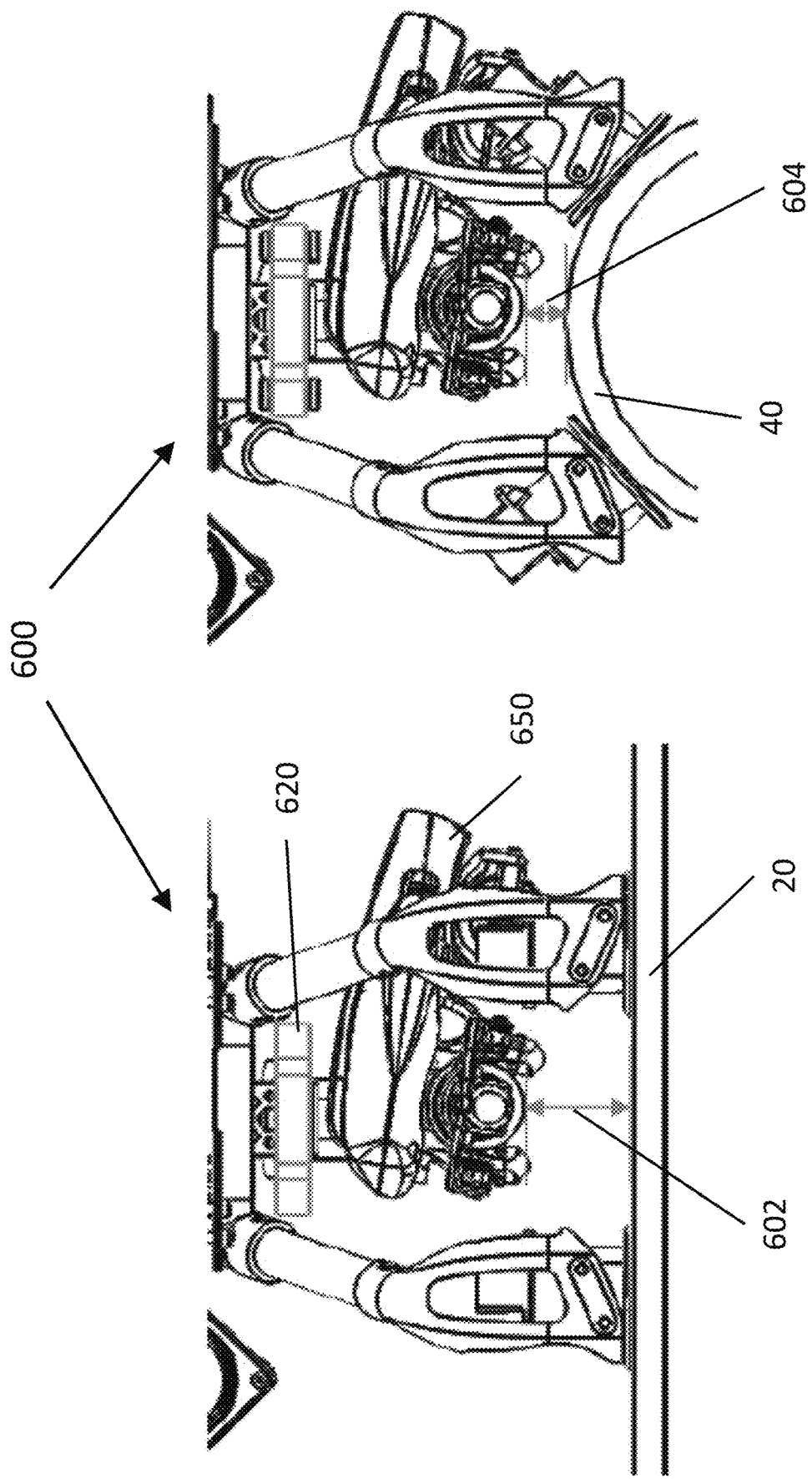
FIGS. 6A-6B are front views of an example UAV with a docking mechanism and attached magnetic crawler, the UAV being perched on flat and curved surfaces, respectively, according to an embodiment.

Example embodiments of the present disclosure are directed to an unmanned aerial vehicle (UAV) having a docking mechanism that securely attaches a small magnetic crawling vehicle to the UAV during flight. Further, the docking mechanism releases the crawler onto a ferromagnetic surface such as a pipe or a vessel after the UAV lands on the surface. The crawler roams freely on the pipe. In some embodiments, the crawler has an ultrasonic testing (UT) sensor for performing thickness measurements of the surface. After job completion, the crawler docks back into the UAV using the same docking mechanism, which again securely attaches the crawler to the UAV. The UAV then takes off with the attached crawler from the surface. Further embodiments of the present disclosure are directed to a mother UAV that flies and lands on a pipe, with a child magnetic crawler attached to the UAV by an attachment mechanism within the UAV. The attachment mechanism releases the UAV to rove on the pipe and perform inspection scans such as thickness measurements using, for example, a UT sensor.

As discussed earlier, one of the top challenges in the oil and gas industry is the periodic inspection or maintenance of elevated assets found in refineries, gas plants, offshore platforms, and other plants and facilities. These assets include high-elevation pipes and structures that are difficult to access during inspection jobs. Even automated, mechanical, or robotic techniques face challenges accessing these surfaces, many of which are high, curved, sideways, upside down (with reference to gravity), or otherwise difficult to reach and sense.

It is in regard to these and other problems that embodiments of the present disclosure are directed to effective techniques that combine a UAV and a releasable crawler using an integrated docking mechanism in the UAV. In some embodiments, the combination allows for performing continuous UT scans of remote, distant, high, or otherwise difficult-to-access pipes or other structures without the need for scaffolding or other expensive alternatives. In some embodiments, the docking mechanism allows seamless coupling of the UAV to the magnetic crawler, and permits the two vehicles to move and perform together or independently. Described herein are numerous features and details of UAVs and their integrated docking mechanisms for securing releasable magnetic crawlers that inspect remote ferromagnetic surfaces (such as cylindrical surfaces, as in a pipe or storage tank). Example embodiments of these features and techniques are illustrated in FIGS. 1A-13 and described in the text that follows.

FIG. 1A-1B illustrate an example unmanned aerial vehicle (UAV) 100 having a docking mechanism, the UAV 100 being shown on a pipe 40 with a releasable magnetic crawler 150 that is respectively attached to and detached from the UAV, according to an embodiment.

In further detail, FIGS. 1A-1B show the mother-child configuration of the UAV 100 and magnetic crawler 150 in action. FIG. 1A shows the UAV 100 after landing on the pipe 40 with the crawler 150 still docked in it. FIG. 1B shows the crawler 150 after being released from the UAV 100 to perform an inspection job (such as a UT thickness scan) on the pipe 40.

FIG. 2 is a front view of an example UAV 200 having a docking mechanism 220 securing a magnetic crawler 250 to the UAV 200, according to an embodiment. FIG. 2 illustrates an integrated system that includes the UAV 200 and the crawler 250 together with the docking mechanism 220 that allows the two vehicles (UAV 200 and crawler 250) to mechanically attach and detach to and from one another.

In further detail with reference to FIG. 2, the UAV 200 and integrated docking mechanism 220 feature many attributes that make them function well with the magnetic crawler 250 in order to perform tasks such as inspecting ferromagnetic surfaces. Some of these attributes include active deployment of the crawler 250 on most pipe diameters (such as all pipe diameters six inches or larger). The docking mechanism 220 includes a linear actuator 240 for lowering the magnetic crawler 250 to the ferromagnetic surface (such as pipe 40) and for raising the magnetic crawler 250 from the surface. The linear actuator 240 provides sufficient powered detachment force to overcome the magnetic attraction of the magnetic crawler 250 to the ferromagnetic surface. As illustrated in more detail below, the docking mechanism 220 further includes a docking hook having passive latches that securely hold the magnetic crawler 250 in place during flight without any power. These passive latches also provide for automatic release upon contact of the magnetic crawler 250 with the ferromagnetic surface.

The UAV 200 includes a body 210 to which other components of the UAV 200 are attached or coupled, such as propellers 212, landing legs 214, control circuit 216, and the docking mechanism. The control circuit 216 (such as a microprocessor or custom logic circuit) is programmed or otherwise configured to perform automated tasks of the UAV 200, such as controlling the raising and lowering of the magnetic crawler 250 by the linear actuator 240 as well as flying and landing of the UAV by the propellers 212 and landing legs 214.

FIGS. 3A-3B illustrate an example UAV 300 having a docking mechanism respectively securing and not securing a magnetic crawler 350, according to an embodiment. Here, the UAV 300 includes a body 310 and a docking mechanism attached to the body 310. The docking mechanism includes a docking hook 330 (for coupling to and securing the magnetic crawler 350) and a linear actuator 340 (for raising and lowering the docking hook 330 and attached magnetic crawler 350 with respect to the UAV 300).

In further detail with reference to FIGS. 3A-3B, the UAV 300 has a hook (or docking hook) 330 connected to the linear actuator 340 that moves the docking hook 330 up and down. In addition, the magnetic crawler 350 has a docking adapter including a cylindrical rod (or docking rod) coupled to the chassis of the magnetic crawler 350, and a top hat- or knob-like object (referred to as a docking knob from now on). The docking knob has a larger diameter than the docking rod (to allow securing of the docking knob by the docking rod), and is attached to the crawler chassis by the docking rod. In some embodiments, the docking rod is rigidly connected to the crawler chassis and the docking knob is rigidly connected to the docking rod (and to the crawler chassis through the docking rod). The docking hook 330 grabs the docking knob and pulls the docking knob up to magnetically detach the magnetic crawler 350 from the pipe. The docking hook 330 is also equipped with latches (such as passive latches) that hold the docking rod in place so the magnetic crawler does not fall during flight.

FIGS. 4A-4B illustrate an example magnetic crawler 450 having a docking adapter 470 for docking with a UAV (such as UAV 200) having a docking mechanism (such as docking mechanism 220), according to an embodiment. The docking adapter 470 includes a docking knob 472 and a docking rod 474. The docking adapter 470 is rigidly attached to the crawler chassis 460 via the docking rod 474. The magnetic crawler 450 further includes magnetic wheels 462 for magnetically adhering to a ferromagnetic surface (such as a carbon steel pipe or vessel). In addition, the magnetic crawler 450 includes a UT sensor 464 for performing thickness measurements of the ferromagnetic surface.

FIGS. 5A-5B are side views of an example UAV 500 with a docking mechanism 520 attached to a magnetic crawler 550 in lowered and raised positions, respectively, according to an embodiment. Here, the UAV 500 is on a flat ferromagnetic surface 20, such as the top of a storage tank or a home base of operations. FIG. 5A illustrates the magnetic crawler 550 either after lowering the magnetic crawler 550 for deployment on the flat surface 20, or after retrieving the magnetic crawler 550 from such as a deployment. FIG. 5B illustrates the secured magnetic crawler 550 either after landing the UAV 500 on the flat surface 20, or prior to takeoff from the flat surface 20.

In further detail with reference to FIGS. 5A-5B, the docking mechanism 520 includes a linear actuator (such as linear actuator 240). The linear actuator has the dual role of (1) lowering the magnetic crawler 550 onto the flat surface 20 (or a curved ferromagnetic surface, such as pipe 40) in order to magnetically attach the magnetic crawler 550 to the flat surface 20 (or curved surface) as well as (2) prying the magnetic crawler 550 away from the flat surface 20 (or curved surface) and raising the magnetic crawler 550 from the surface when detaching is needed.

FIGS. 6A-6B are front views of an example UAV 600 with a docking mechanism 620 and attached magnetic crawler 650, the UAV being perched on flat 20 and curved 40 surfaces, respectively, according to an embodiment. For example, in some embodiments, the curved surface 40 is that of a small pipe (such as a six inch pipe).

With further reference to FIGS. 6A-6B, the UAV 600 is landing on a flat surface 20 (in FIG. 6A) and on a pipe 40 (in FIG. 6B). This produces a corresponding deployment distance 602 (or gap) between the magnetic crawler 650 and the flat surface 20, and a deployment distance 604 (or gap) between the magnetic crawler 650 and the pipe 40. As illustrated in the comparison, these gaps between the magnetic crawler 650 and the surface depend on the degree of curvature, such as the diameter of the pipe 40, or lack of curvature, in the case of the flat surface 20. In other words, the smaller the pipe diameter is, the smaller the gap between the magnetic crawler 650 and the pipe surface (with the flat surface 20 being equivalent to that of a pipe having a very large diameter). This means that the magnetic crawler 650 has to be lowered to a different height (different displacements or deployment distances) depending on the pipe diameter in order to be properly deployed onto the surface.

Figures 7A, 7B:
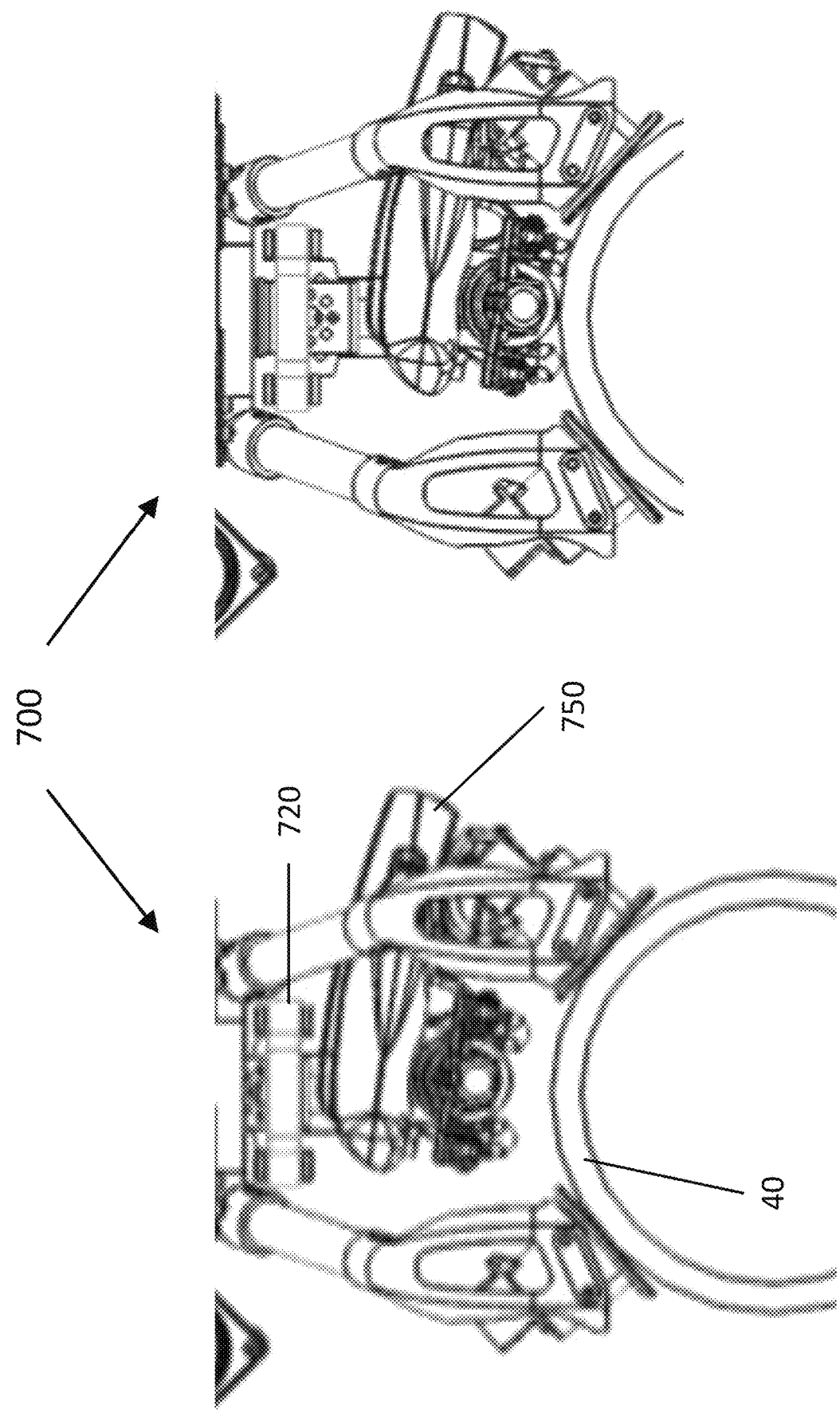
FIGS. 7A-7B are front views of an example UAV perched on a pipe, the UAV having a docking mechanism and attached magnetic crawler in raised and lowered positions, respectively, according to an embodiment.

FIGS. 7A-7B are front views of an example UAV 700 perched on a pipe 40, the UAV 700 having a docking mechanism 720 and attached magnetic crawler 750 in raised and lowered positions, respectively, according to an embodiment. FIG. 7B shows the magnetic crawler 750 pushed down onto the surface of the pipe 40 from its pre-deployment (secured) position in FIG. 7A. The magnetic crawler 750 is lowered by the docking mechanism (more specifically, by a linear actuator) until the magnetic crawler 750 (more specifically, magnetic wheels of the magnetic crawler 750) contacts and magnetically adheres to the surface of the pipe 40. This is the deployment distance discussed with reference to FIG. 6B.

In the example embodiments discussed so far, the docking mechanism uses a linear actuator that drives the docking hook up and down and controls the vertical position of the magnetic crawler measured from the UAV's main body (or just body for short). In other embodiments, different actuators are used, such as a motor connected to a suitable linkage mechanism.

In some embodiments, a control loop (such as controlled by an on-board controller, as in control circuit 216) is used to determine at which vertical position the magnetic crawler should be lowered in order to contact (or magnetically adhere to) the ferromagnetic surface on which the UAV has landed or is perched. As mentioned before, this position depends on factors such as the pipe diameter, where smaller pipe diameters require higher deployment points (and shorter deployment distances).

In various embodiments, different types of feedback sensors are used as part of this control loop. In some embodiments, a downward facing distance/proximity/range detection sensor such as an ultrasound or 1D LIDAR (one dimensional light detecting and ranging) sensor is mounted to the UAV body (such as near the docking mechanism). The distance sensor then measures the distance between the UAV's body and the pipe surface, and supplies these distance measurements to the on-board controller for use with the control loop.

In some other embodiments, the UAV's navigation and environment scanning sensors are used to determine the pipe diameter. In some such embodiments, the UAV has a depth camera and a 2D (two dimensional) LIDAR used for navigation and autonomous landing on the pipe. The depth camera and 2D LIDAR are used to measure the pipe diameter. For example, in some such embodiments, the controller is programmed to calculate the pipe diameter from the pipe's orientation, shape, and distance as measured (or determined) from the depth camera and 2D LIDAR data. The controller is further programmed to calculate the necessary crawler vertical displacement to the pipe surface using a mathematical model based on the geometry and dimensions of the UAV, docking mechanism, and landing legs.

In some other embodiments, angle sensors in the UAV landing legs are used to measure the curvature of the pipe. Here, the landing legs self-adjust themselves to a tangential (e.g., tangent with respect to the outwardly curved landing surface) orientation when landing. For instance, in some embodiments, the landing legs are magnetic (such as switchable magnetics legs) that self-adjust across various pipe diameters, and these adjustments are measured by, for example, a potentiometer.

In some other embodiments, a current or force sensor is employed in the linear actuator to detect contact or collision between the magnetic crawler and the ferromagnetic surface. These detections or measurements are then provided to the control loop to be used as indicators for reaching the required position. In some other embodiments, the magnetic crawler employs contact sensors on its bottom to signal reaching the surface. These sensed contacts are then provided to the control loop as indicators of reaching the desired lowering of the magnetic crawler.

In some embodiments, the docking mechanism also features the ability to create an extra pushdown force onto the magnetic crawler after the crawler contacts the pipe's surface. For instance, in some such embodiments, this is needed to sufficiently articulate the magnetic wheels (e.g., tangential contact) of the magnetic crawler that the wheels fully engage and magnetically adhere to the ferromagnetic surface. Moreover, in some such embodiments, the magnetic crawler uses components (e.g., sensors, support caster balls) attached to springs that require compression during attachment/deployment. As such, in some embodiments, the extra pushdown force accomplishes this.

In some embodiments, the linear actuator is also used to provide the necessary detachment force to overcome the magnetic adhesion between the pipe and the magnetic crawler. This detachment force is an upward force that separates the magnetic crawler from the ferromagnetic surface to which the crawler is attached.

Figure 8:
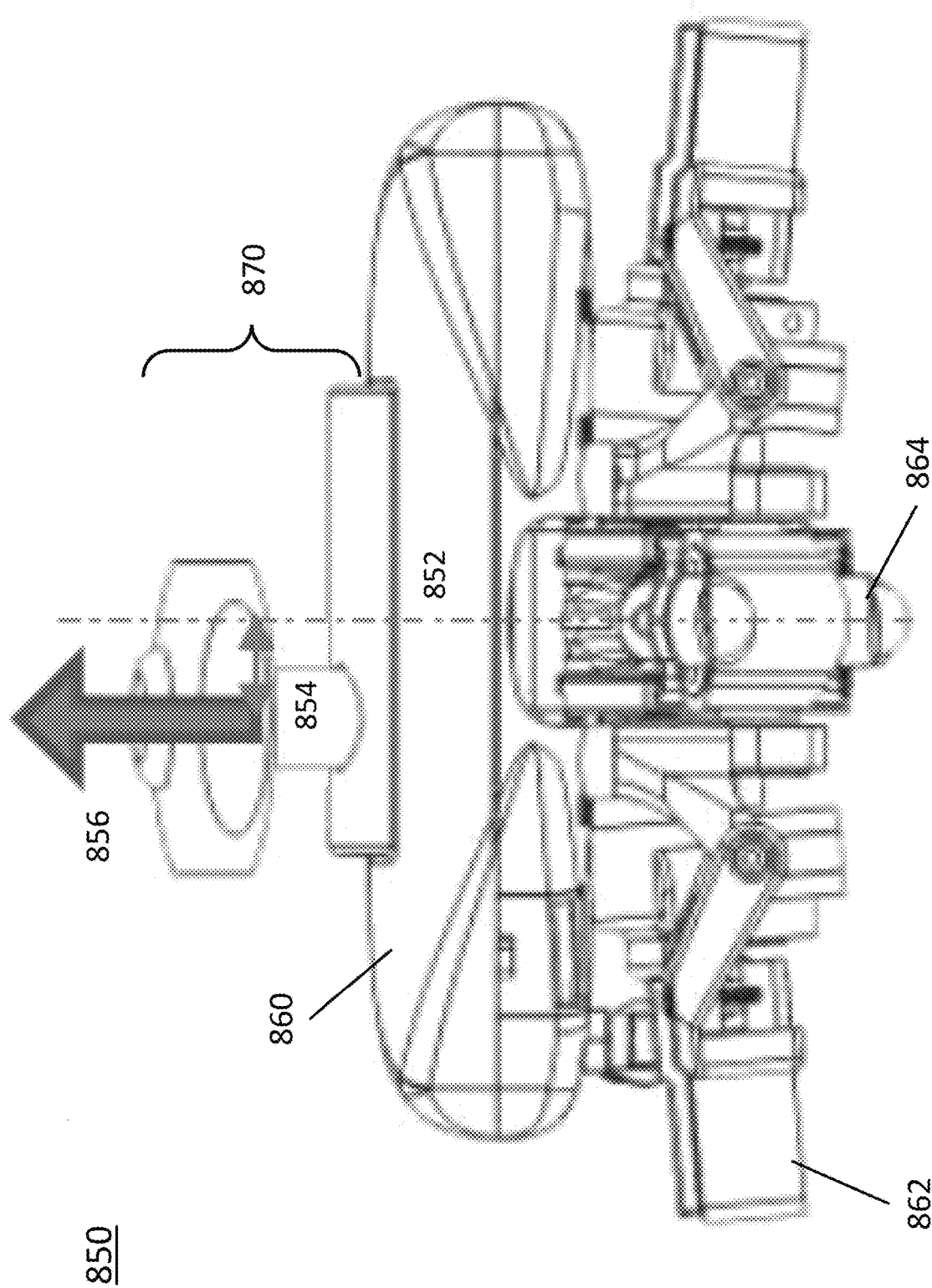
FIG. 8 is a front view of an example magnetic crawler having a docking adapter for attaching to a UAV with a docking mechanism, according to an embodiment.

FIG. 8 is a front view of an example magnetic crawler 850 having a docking adapter 870 for attaching to a UAV with a docking mechanism, according to an embodiment. The docking adapter 870 is firmly attached to the chassis 860 of the magnetic crawler 850. The magnetic crawler 850 also includes magnetic wheels 862 for magnetically attaching to and maneuvering on the curved ferromagnetic surface. In addition, the magnetic crawler 850 includes a UT sensor 864, such as for performing UT thickness measurements of the surface on which the magnetic crawler 850 is deployed.

In further detail with reference to FIG. 8, the magnetic crawler 850 is pulled through the docking adapter 870 by a detaching force 856 not from the center (as indicated by centerline 852). Here, "center" is in reference to a center of mass of the magnetic crawler 850 (or crawler chassis 860) in relation to the direction of gravity. Instead, the detaching force 856 is directed off-center by locating the docking adapter 870 (and in particular, the docking rod of the docking adapter 870) with an offset 854 from the centerline 852. This decreases the amount of pulling force (detaching force 856) required to detach the magnetic crawler. This is because attempting to pull the magnetic crawler 850 from its center maximizes the among of pulling force needed, as the magnetic resistance of the magnetic wheels 862 is maximized. Locating the docking adapter 870 off-center helps isolate the magnetic resistance to one or only a few of the magnetic wheels 862. This wheel (or wheels) then detaches first, allowing the others to detach separately afterwards. This lessens the detaching force 856 needed to detach the magnetic crawler 850 from the ferromagnetic surface, as the linear actuator does not need to act against the full combined adhesion of all of the magnetic wheels 862 at the same time.

Figure 9:
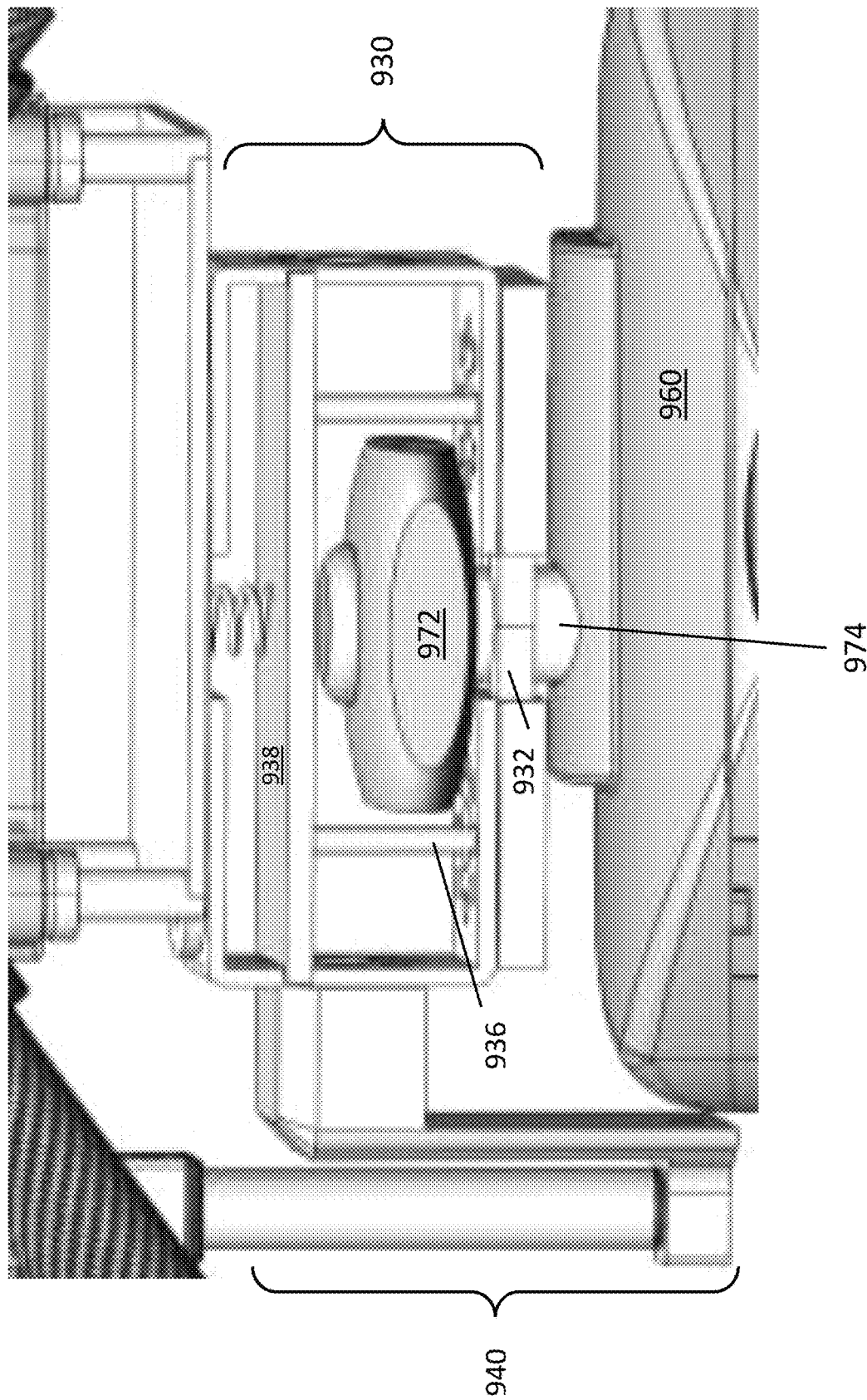
FIG. 9 is a front view of an example docking mechanism attaching a magnetic crawler to a UAV, according to an embodiment.

FIG. 9 is a front view of an example docking mechanism 920 attaching a magnetic crawler (through crawler chassis 960) to a UAV, according to an embodiment. The docking mechanism includes a docking hook 930 and a linear actuator 940. The docking hook 930 couples to the magnetic crawler through a docking adapter that includes docking knob 972 and docking rod 974.

In addition, the docking hook 930 includes passive latches 932 (e.g., spring-loaded) for securing the docking rod 974 of the magnetic crawler to the docking hook 930. The passive latches 932 are secured shut using locking pins 936 that prevent the passive latches 932 from opening. However, lowering the magnetic crawler via linear actuator 940 after the crawler contacts the surface causes the docking knob 972 to rise, which forces false ceiling 938 up and detaches the locking pins 936 from the passive latches 932. This allows the passive latches 932 to open and the magnetic crawler to exit or deploy from the docking hook 930. Once the magnetic crawler leaves, the docking knob 972 no longer exerts an upward force on the false ceiling 938, so the false ceiling 938 passively lowers (via a spring attached to the top of false ceiling 938) and relocks the passive latches 932 using the locking pins 936. The passive latches 932 stay locked until the magnetic crawler is resecured to the docking hook and redeployed by this procedure.

In further detail with reference to FIG. 9, the passive latches 932 are spring-loaded. The docking rod 974 is held in place by a combination (on two sides, an exit side and an entry side) of spring-loaded latches 932 to prevent the attached magnetic crawler from falling during flight. Some of the latches 932 are also locked using safety locking pins (e.g., locking pins 936) to prevent accidental opening of the latches 932.

Figure 10:
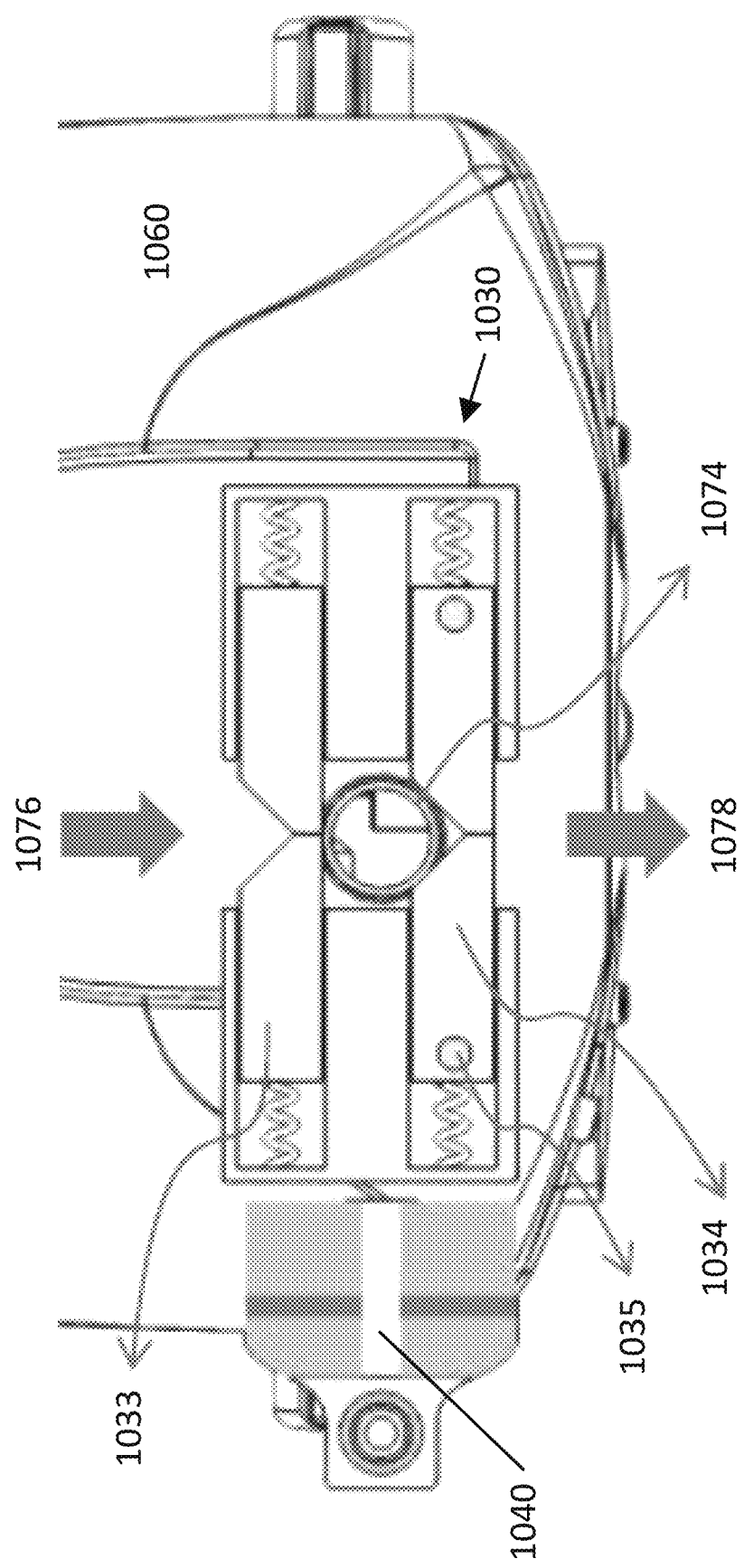
FIG. 10 is a top cross-sectional view of a docking mechanism attaching a magnetic crawler to a UAV, according to an embodiment.
Figure 11:
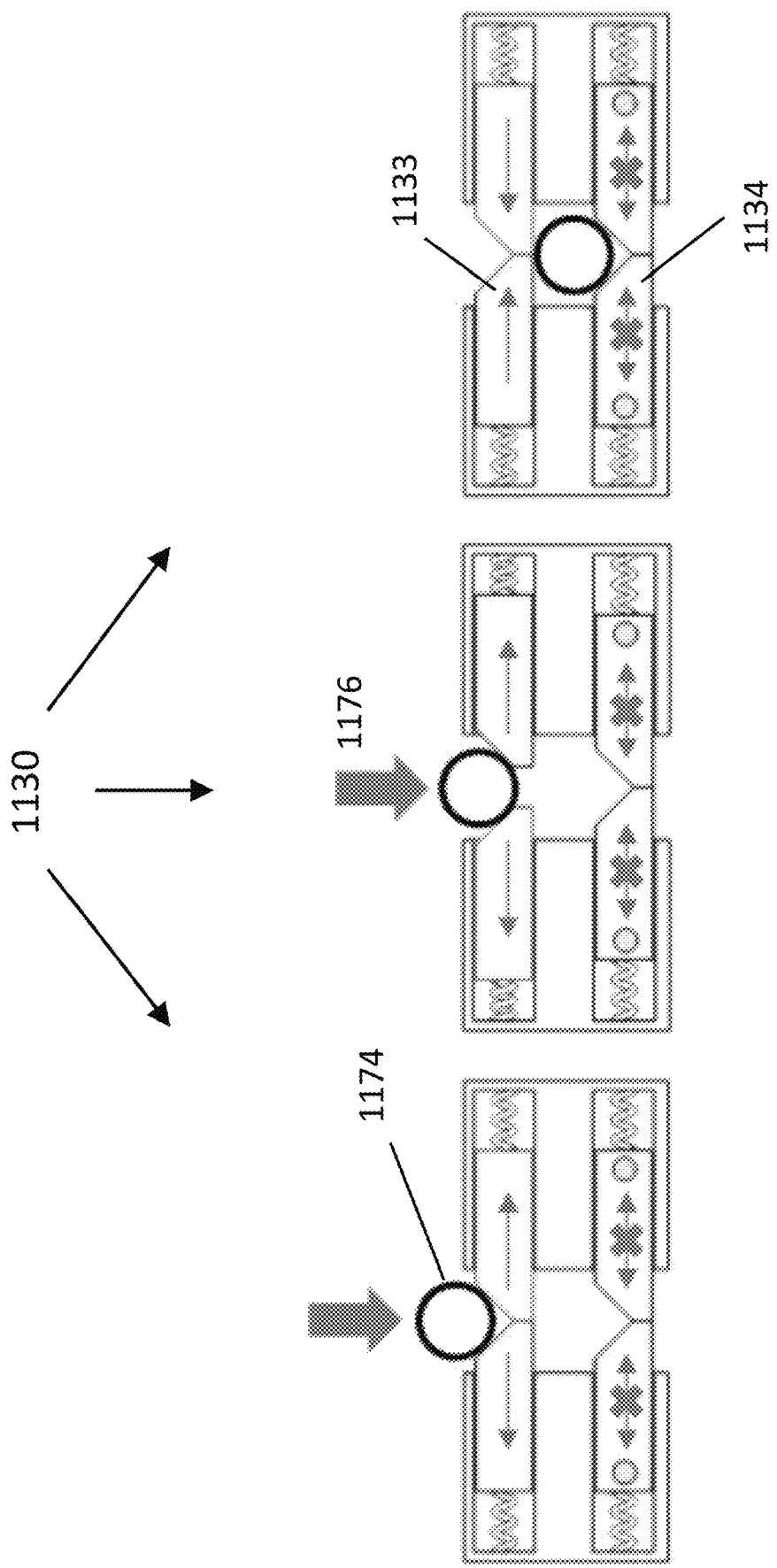
FIGS. 11A-11C are a series of top cross-sectional views of a docking hook of a UAV illustrating a magnetic crawler entering and being passively secured to the docking hook, according to an embodiment.

FIG. 10 is a top cross-sectional view of a docking mechanism 1020 (of a UAV) attaching a magnetic crawler (including crawler chassis 1060 and crawler docking rod 1074) to the UAV, according to an embodiment. The docking mechanism 1020 includes docking hook 1030 and linear actuator 1040 coupling the docking hook 1030 (and the attached magnetic crawler) to the UAV.

In addition, the docking hook 1030 includes two pairs of passive (spring-loaded) latches, namely entry latches 1033 and exit latches 1034 for securing the docking rod 1074 during flight (as well as right after landing and before takeoff). Further, the exit latches 1034 include safety lock holes 1035 to lock the exit latches 1034 (e.g., via locking pins, as in locking pins 936). The entry and exit latches 1033 and 1034 are notched on one side to permit passive opening of the latches 1033 and 1034 by the magnetic crawler (via docking rod 1074) from the intended direction (e.g., crawler entry direction 1076 to enter the docking hook 1030, crawler exit direction 1078 to exit the docking hook 1030) while blocking opening from the other direction.

In further detail with reference to FIG. 10, the docking mechanism 1020 is shown from the top, illustrating the entry and exit latches 1033 and 1034 in action from a cross-section just under the docking knob. In particular, FIG. 10 exhibits how the entry and exit latches 1033 and 1034 surround and secure the docking rod 1074 to the docking hook 1030 (and with it, the magnetic crawler). As such, FIG. 10 illustrates how the crawler's docking rod 1074 interacts with the captivating latches (entry latches 1033 and exit latches 1034), in particular how the four passive latches 1033 and 1034 capture the docking rod 1074 to prevent the docking rod 1074 (and with it, the magnetic crawler) from falling.

FIGS. 11A-11C are a series of top cross-sectional views of a docking hook 1130 of a UAV illustrating a magnetic crawler entering (via docking rod 1174) and being passively secured to the docking hook 1130, according to an embodiment. Here, the magnetic crawler enters the docking hook 1130 in the crawler entry direction 1176, encountering the notched sides of the entry latches 1133 (FIG. 11A). The passive entry latches 1133 give way under the force of the docking rod 1174 and start to separate, creating an opening (FIG. 11B). Once fully open, the entry latches 1133 allow the docking rod 1174 to enter, at which point the spring-loaded entry latches 1133 shut behind the docking rod 1174 and secure the docking rod 1174 to the docking hook 1130. The exit latches 1134 remain locked because of the locking pins (e.g., locking pins 936) inserted into safety lock holes (e.g., safety lock holes 1035) of the exit latches 1134.

In further detail with reference to FIGS. 11A-11C, these drawings illustrate how the magnetic crawler enters (as shown from the top of the drawings) in order to dock into the UAV (or more precisely, the docking hook 1130 of the UAV). The entry latches 1133 allow the docking rod 1174 to enter but not to exit (in either forward or reverse directions to the crawler entry direction 1176). The crawler's docking rod 1174 opens these spring-loaded latches 1133, which then shut behind the docking rod 1174 after entry. The exit latches 1134 are secured shut and do not open even if the magnetic crawler keeps driving forward because there are safety locking pins holding these latches 1134 in place. Accordingly, the magnetic crawler stays secured in place during flight between these four latches 1133 and 1134.

Figure 12:
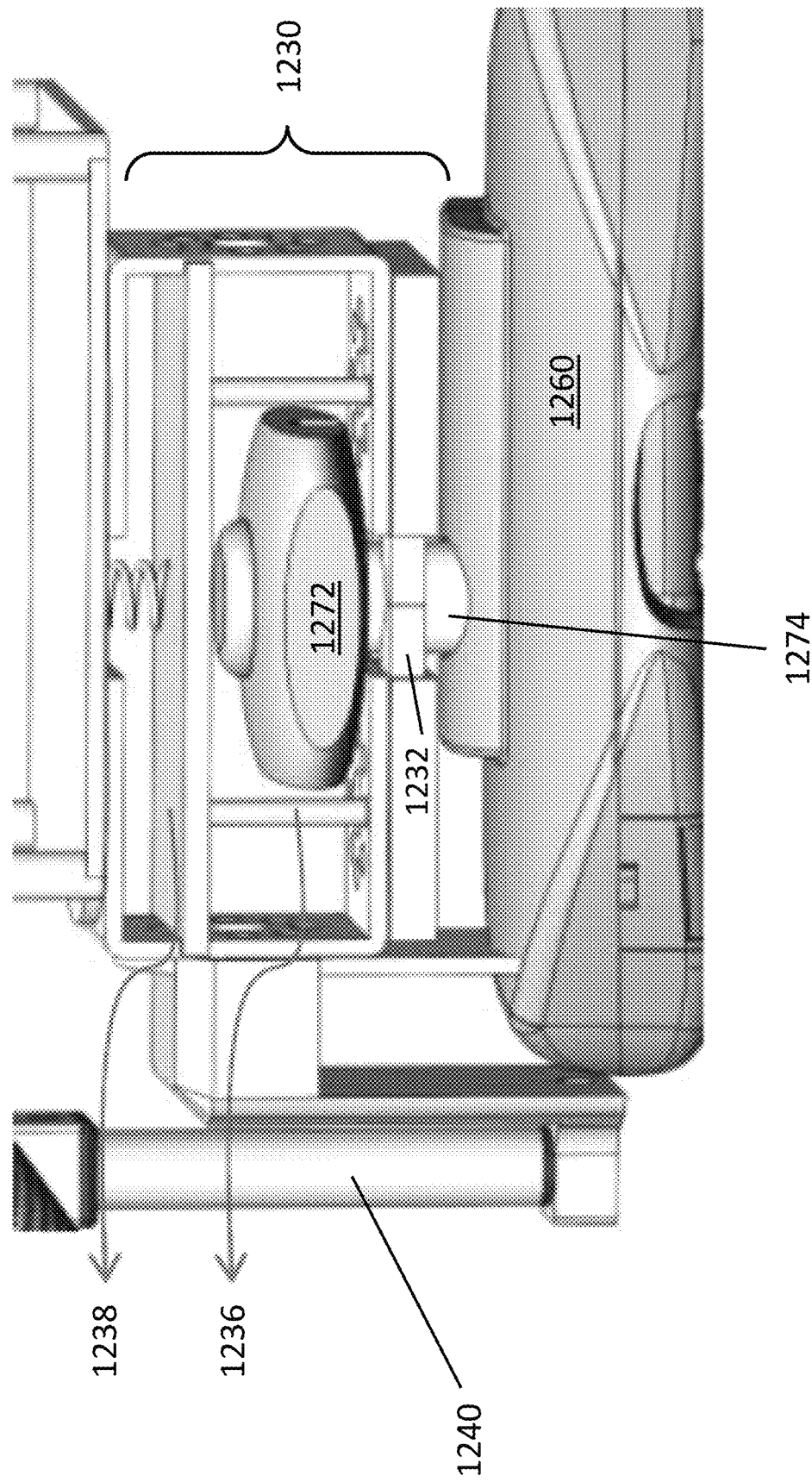
FIG. 12 illustrates an example docking mechanism attaching a magnetic crawler to a UAV, according to an embodiment.

FIG. 12 illustrates an example docking mechanism 1220 attaching a magnetic crawler (including crawler chassis 1260) to a UAV, according to an embodiment. The docking mechanism 1220 includes a docking hook 1230 and a linear actuator 1240. The magnetic crawler includes a docking adapter including a docking knob 1272 and a docking rod 1274. The docking hook 1230 includes passive latches 1232 to secure the docking rod 1274 and permit the entry and exit of docking rod 1274. The docking hook 1230 also includes safety lock pins (locking pins) 1236 that couple with the passive latches 1232 and lock the passive latches 1232 from accidentally opening. The docking hook 1230 further includes a spring-loaded false ceiling 1238 to passively control the locking pins 1236 so that the passive latches 1232 only open when appropriate (e.g., when deploying the magnetic crawler on a ferromagnetic surface) and otherwise remain locked shut.

In further detail with reference to FIG. 12, this drawing illustrates how the passive latches 1232 allow the magnetic crawler to undock and get released from the UAV. The linear actuator 1240 lowers the magnetic crawler, which is hanging in the docking hook 1230, until the crawler touches the pipe surface. After contact, the linear actuator 1240 keeps lowering the docking hook 1230 down, which causes the magnetic crawler's docking adapter (specifically the docking rod 1272) to move up relative to the docking hook because the docking knob 1272 (along with the rest of the crawler) stopped moving once the crawler hit the pipe surface. The linear actuator 1240 keeps lowering the docking hook 1230, at which point the docking knob 1272 hits the false ceiling 1238 and starts moving the false ceiling 1238 up. The false ceiling 1238 is connected to the safety locking pins 1236, which start to disengage from inside the passive latches 1232. This allows the exit latches 1232 to be free to open if forced. Accordingly, the magnetic crawler starts moving in the exit direction, pushing the exit latches away and opening them in the process, all the while still holding the false ceiling 1238 up. The magnetic crawler then exits, the passive latches 1232 close shut behind the crawler, the docking knob disengages with the false ceiling 1238, and the false ceiling 1238 drops, again forcing the safety locking pins 1236 to penetrate the passive latches 1232, locking them in the closed position.

In some embodiments, the docking mechanism has two doors with passive latches, one for entry (docking) and one for exit (undocking). This allows the magnetic crawler to drive forward to dock the crawler with the docking mechanism, and then keep driving forward to undock the crawler without the need to drive in reverse for either of these two operations. This is useful for scenarios where driving in reverse is undesirable or impossible. For instance, a one-door docking mechanism would likely necessitate reverse driving to either dock or undock (depending, for example, on which operation is done while driving forward). Driving in reverse is sometimes undesirable, such as when the magnetic crawler cannot drive in reverse or when the crawler is operated remotely and only has forward-facing cameras (and thus it is not safe or practical to drive in reverse).

In some embodiments, a switchable magnet is added inside the docking mechanism. The switchable magnet allows the magnetic crawler to be secured in place when the docking knob is ferromagnetic or magnetic. In some embodiments, the switchable magnet is switched on by default and only turned off to allow undocking. In some embodiments, the switchable magnet is in addition to the passive latches, while in some other embodiments, the switchable magnet is a replacement for the passive latches. In some embodiments, the switchable magnet is turned on and off using a mechanical actuator. In some embodiments, the switchable magnet is turned on and off through a connected linkage mechanism to the false ceiling that turns the magnet off when deploying the magnetic crawler onto the surface.

In some embodiments, the docking mechanism includes electrical connections, such as for power and communication with the attached magnetic crawler. In some embodiments, the docking mechanism features autonomous docking, where the crawler localizes itself with respect to the UAV using, for example, QR codes attached to the docking hook. In some embodiments, contact sensors are added in the passive latches in order to indicate and signal when the magnetic crawler is docked in the UAV as well as when the crawler is undocked.

As described above in many of the embodiments, the docking mechanism has two doors with passive latches, one for entry (docking) and one for exit (undocking), which prevents the need to drive the magnetic crawler in reverse. However, in some embodiments, reversing is not an issue, and the docking mechanism features a single door for both docking and undocking. Here, the passive latches open while docking but shut closed once docked and stay closed to prevent the magnetic crawler from falling during flight of the UAV. In some such embodiments, a mechanical linkage connected to the false ceiling is used to open the latches for undocking the magnetic crawler on the surface.

In some embodiments, the docking mechanism is similar to the above-described embodiments, only the docking mechanism does not have passive latches. Instead, the docking mechanism replaces the crawler's docking knob with a rotatable horizontal rod or beam on top of the magnetic crawler this is used to dock and undock the crawler. Here, the horizontal rod is attached to the crawler through a rotating joint that allows the rod to rotate in two specific configurations for docking and undocking. In addition, the docking hook is configured with a channel (between two parallel sides) that is wider than the narrow direction of the horizontal rod (to allow the horizontal rod to travel through the docking hook unimpeded in the narrow direction) but is narrower than the wide direction of the horizontal rod (to allow the horizontal rod to attach or hook onto the docking hook in the wide direction).

In further detail, in the docked position, the horizontal rod is rotated such that it rests on a docking mechanism holder (e.g., perpendicular to the two sides of the docking mechanism holder, to engage the docking mechanism holder on both sides). As such, when the crawler is undocking, the horizontal rod is rotated 90 degrees (e.g., parallel to both sides of the docking mechanism holder, to disengage the docking mechanism holder on both sides) so that the horizontal rod is able to drive out of the docking mechanism holder without any interference from the docking mechanism holder. As described, these embodiments with the horizontal rod do not require the passive latches that were described in many of the above embodiments.

In some horizontal rod embodiments, the rotation of the horizontal rod through a rotating joint on top of the magnetic crawler is achieved through an active motion using a motor. In some other horizontal rod embodiments, the rotating joint is achieved through a passive motion using a dedicated mechanism. In some such passive motion embodiments, the passive mechanism is based on the false ceiling described previously. Here, when the magnetic crawler contacts the surface by the continued lowering of the linear actuator, the horizontal rod starts pushing the false ceiling upward. This linear motion is converted to a rotational motion through a passive mechanism, which then engages with the horizontal rod and turns the horizontal rod 90 degrees in order to perform the undocking.

With reference to FIGS. 1A-12, in some example embodiments, an unmanned aerial vehicle (UAV, such as UAV 100, 200, 300, 500, 600, or 700) includes a body (such as body 210 or 310) and a docking mechanism (such as docking mechanism 220, 520, 620, 720, 920, 1020, or 1220) coupled to the body. The docking mechanism secures a magnetic crawler (such as magnetic crawler 150, 250, 350, 450, 550, 650, 750, or 850) to the body during flight of the UAV and during landing of the UAV on a ferromagnetic cylindrical surface (such as pipe 40) after the flight. The docking mechanism includes a docking hook (such as docking hook 330, 930, 1030, 1130, or 1230) that couples to the magnetic crawler. The docking hook includes passive latches (such as passive latches 932 or 1232) that passively: release the magnetic crawler from the docking hook after the landing in order to deploy the magnetic crawler on the cylindrical surface; receive the magnetic crawler into the docking hook after the deployment in order to retrieve the magnetic crawler from the cylindrical surface; and secure the magnetic crawler to the body during the flight, during the landing, and during takeoff of the UAV from the cylindrical surface after the retrieval.

The docking mechanism also includes a linear actuator (such as linear actuator 240, 340, 940, 1040, or 1240) coupling the docking hook to the body and that lowers the docking hook and coupled magnetic crawler from the body to the cylindrical surface as part of the deployment, and raises the docking hook and received magnetic crawler from the cylindrical surface to the body as part of the retrieval.

In an embodiment, the linear actuator lowers the docking hook and coupled magnetic crawler by magnetically attaching the magnetic crawler to the cylindrical surface, and raises the docking hook and received magnetic crawler by magnetically detaching the magnetic crawler from the cylindrical surface. In an embodiment, the magnetic crawler includes a chassis (such as crawler chassis 460, 860, 960, 1060, or 1260) and a docking adapter (such as docking adapter 470 or 870) coupled to the chassis and that passively secures the chassis to the docking hook. The docking adapter includes a docking knob (such as docking knob 472, 972, or 1272) that couples to the docking hook, and a docking rod (such as docking rod 474, 974, 1074, 1174, or 1274) coupling the docking knob to the chassis. The passive latches passively surround a section of the docking rod during the coupling of the docking knob to the docking hook in order to passively secure the chassis to the docking hook.

In an embodiment, the docking rod is off-centered with respect to a gravity direction of the center of mass of the chassis. In an embodiment, the docking rod is cylindrical. In an embodiment, the passive latches include entry latches (such as entry latches 1033 or 1133) on an entry side of the docking hook and exit latches (such as exit latches 1034 or 1134) on an exit side of the docking hook opposite the entry side. The entry latches passively open and receive the magnetic crawler on the entry side as part of the retrieval and otherwise remain passively shut. The exit latches passively open and release the magnetic crawler on the exit side as part of the deployment and otherwise remain passively shut.

In an embodiment, the docking hook includes locking pins (such as locking pins 936 or 1236) that passively couple to the exit latches in order to prevent the exit latches from opening, and passively uncouple from the exit latches when the docking hook and coupled magnetic crawler are lowered to the cylindrical surface in order to allow the exit latches to passively open and release the magnetic crawler. In an embodiment, the locking pins passively re-couple to the exit latches in order to prevent the exit latches from opening after the magnetic crawler has been released.

In an embodiment, the magnetic crawler includes a chassis and a docking adapter coupled to the chassis and that passively secures the chassis to the docking hook. The docking adapter includes a docking knob that couples to the docking hook, and a docking rod coupling the docking knob to the chassis. The entry and exit latches passively surround a section of the docking rod and remain passively shut during the coupling of the docking knob to the docking hook in order to passively secure the chassis to the docking hook. In an embodiment, the magnetic crawler includes an ultrasonic testing (UT) thickness sensor that nondestructively measures a thickness of the cylindrical surface after the deployment and before the retrieval. In an embodiment, the cylindrical surface is part of a carbon steel pipe or vessel (such as a storage tank). In an embodiment, the UAV further includes a control circuit (such as control circuit 216) coupled to the body and configured by code to control the linear actuator in order to control the lowering of the docking hook and coupled magnetic crawler to the cylindrical surface based on feedback from a deployment sensor (such as a distance sensor).

The described techniques herein can be implemented using a combination of sensors, cameras, and other devices including computing or other logic circuits configured (e.g., programmed) to carry out their assigned tasks. These devices are located on or in (or otherwise in close proximity to) the body of the UAV or the chassis of the magnetic crawler for carrying out the techniques. In some example embodiments, the control logic is implemented as computer code configured to be executed on a computing circuit (such as a microprocessor) to perform the control steps that are part of the technique.

FIG. 13 is a flow diagram of an example method 1300 of operating a UAV (such as UAV 100, 200, 300, 500, 600, or 700) with a docking mechanism (such as docking mechanism 220, 520, 620, 720, 920, 1020, or 1220) for attaching and detaching a magnetic crawler (such as magnetic crawler 150, 250, 350, 450, 550, 650, 750, or 850), according to an embodiment. The UAV includes a body (such as body 210 or 310) and the docking mechanism coupled to the body. The method 1300 is partially automated under the control of an electronic circuit (such as control circuit 216), which is configured (e.g., by code, such as programmed) to carry out steps of the method 1300.

Some or all of the method 1300 can be performed using components and techniques illustrated in FIGS. 1A-12. In addition, portions of this and other methods disclosed herein can be performed on or using an onboard controller, such as a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can also be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 700 (or other disclosed method) to be carried out. It should be noted that in other embodiments, the order of the operations can be varied, and that some of the operations can be omitted. Some of the method 1300 can also be performed using logic, circuits, or processors located on or in electrical communication with a processing circuit configured by code to carry out these portions of the method 1300.

In the method 1300, processing begins with the step of securing 1310, by the docking mechanism, the magnetic crawler to the body during flight of the UAV and during landing of the UAV on the ferromagnetic cylindrical surface after the flight by coupling the magnetic crawler to a docking hook (such as docking hook 330, 930, 1030, 1130, or 1230) of the docking mechanism and coupling the docking hook to the body by a linear actuator (such as linear actuator 240, 340, 940, 1040, or 1240) of the docking mechanism. The method 1300 further includes the step of deploying 1320 the magnetic crawler on the cylindrical surface after the landing by lowering, by the linear actuator, the docking hook and coupled magnetic crawler from the body to the cylindrical surface. In addition, the method 1300 includes the step of passively releasing 1330, by passive latches (such as passive latches 932 or 1232) of the docking hook, the lowered magnetic crawler from the docking hook onto the cylindrical surface.

The method 1300 also includes the step of retrieving 1340 the magnetic crawler from the cylindrical surface after the deployment by passively receiving, by the passive latches, the magnetic crawler into the docking hook. Furthermore, the method 1300 includes the step of raising 1350, by the linear actuator, the docking hook and received magnetic crawler from the cylindrical surface to the body. Finally, the method 1300 includes the step of passively securing 1360, by the passive latches, the raised magnetic crawler to the body during takeoff of the UAV from the cylindrical surface after the retrieval.

In some embodiments, lowering the docking hook and coupled magnetic crawler includes magnetically attaching the magnetic crawler to the cylindrical surface, and raising the docking hook and received magnetic crawler includes magnetically detaching the magnetic crawler from the cylindrical surface. In some embodiments, the magnetic crawler includes a chassis (such as crawler chassis 460, 860, 960, 1060, or 1260) and a docking adapter (such as docking adapter 470 or 870) coupled to the chassis, the docking adapter includes a docking knob (such as docking knob 472, 972, or 1272) and a docking rod (such as docking rod 474, 974, 1074, 1174, or 1274) coupling the docking knob to the chassis, and the method 1300 further includes the step of passively securing the chassis to the docking hook by coupling the docking knob to the docking hook while passively surrounding a section of the docking rod with the passive latches.

In some embodiments, the docking rod is off-centered with respect to a gravity direction of the center of mass of the chassis. In some embodiments, the docking rod is cylindrical. In some embodiments, the passive latches include entry latches (such as entry latches 1033 or 1133) on an entry side of the docking hook and exit latches (such as exit latches 1034 or 1134) on an exit side of the docking hook opposite the entry side, passively receiving the magnetic crawler includes passively opening the entry latches and receiving the magnetic crawler on the entry side during the retrieval and otherwise maintaining passive shutting of the entry latches, and passively releasing the lowered magnetic crawler includes passively opening the exit latches and releasing the magnetic crawler on the exit side during the deployment and otherwise maintaining passive shutting of the exit latches.

In some embodiments, the docking hook includes locking pins (such as locking pins 936 or 1236), the method 1300 further includes the step of preventing the exit latches from opening by passively coupling the locking pins to the exit latches, and passively releasing the magnetic crawler includes passively opening the exit latches and releasing the magnetic crawler by passively uncoupling the locking pins from the exit latches when the docking hook and coupled magnetic crawler are lowered to the cylindrical surface. In some embodiments, the method 1300 further includes the step of preventing the exit latches from opening after the magnetic crawler has been released by passively re-coupling the locking pins to the exit latches.

In some embodiments, the magnetic crawler includes a chassis and a docking adapter coupled to the chassis, the docking adapter includes a docking knob and a docking rod coupling the docking knob to the chassis, and the method further includes the step of passively securing the chassis to the docking hook by coupling the docking knob to the docking hook while passively surrounding a section of the docking rod with the entry and exit latches and maintaining the passive shutting of the entry and exit latches. In some embodiments, the magnetic crawler includes an ultrasonic testing (UT) thickness sensor, and the method further comprises nondestructively measuring, by the UT thickness sensor, a thickness of the cylindrical surface after the deployment and before the retrieval. In some embodiments, the cylindrical surface is part of a carbon steel pipe or vessel (such as a storage tank). In some embodiments, the UAV further includes a control circuit (such as control circuit 216) coupled to the body, and the method 1300 further includes the step of controlling, by the control circuit, the linear actuator to control the lowering of the docking hook and coupled magnetic crawler based on feedback from a deployment sensor (such as a distance sensor).

The methods described herein may be performed in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV) comprising:
a body; and
a docking mechanism coupled to the body and configured to secure a magnetic crawler to the body during flight of the UAV and during landing of the UAV on a ferromagnetic cylindrical surface after the flight, the docking mechanism comprising:
a docking hook configured to couple to the magnetic crawler, the docking hook comprising spring-loaded passive latches configured to passively:
release the magnetic crawler from the docking hook after the landing in order to deploy the magnetic crawler on the cylindrical surface;
receive the magnetic crawler into the docking hook after the deployment in order to retrieve the magnetic crawler from the cylindrical surface; and
secure the magnetic crawler to the body during the flight, during the landing, and during takeoff of the UAV from the cylindrical surface after the retrieval; and
a linear actuator coupling the docking hook to the body and configured to lower the docking hook and coupled magnetic crawler from the body to the cylindrical surface as part of the deployment, and to raise the docking hook and received magnetic crawler from the cylindrical surface to the body as part of the retrieval.

2. The UAV of claim 1, wherein the linear actuator is further configured to lower the docking hook and coupled magnetic crawler by magnetically attaching the magnetic crawler to the cylindrical surface, and to raise the docking hook and received magnetic crawler by magnetically detaching the magnetic crawler from the cylindrical surface.

3. The UAV of claim 1, wherein the magnetic crawler comprises a chassis and a docking adapter coupled to the chassis and configured to passively secure the chassis to the docking hook, the docking adapter including:
a docking knob configured to couple to the docking hook; and
a docking rod coupling the docking knob to the chassis, wherein the spring-loaded passive latches are further configured to passively surround a section of the docking rod during the coupling of the docking knob to the docking hook in order to passively secure the chassis to the docking hook.

4. The UAV of claim 3, wherein the docking rod is off-centered with respect to a gravity direction of the center of mass of the chassis.

5. The UAV of claim 3, wherein the docking rod is cylindrical.

6. The UAV of claim 1, wherein the spring-loaded passive latches comprise entry latches on an entry side of the docking hook and exit latches on an exit side of the docking hook opposite the entry side, wherein the entry latches are configured to passively open and receive the magnetic crawler on the entry side as part of the retrieval and to otherwise remain passively shut, and wherein the exit latches are configured to passively open and release the magnetic crawler on the exit side as part of the deployment and to otherwise remain passively shut.

7. The UAV of claim 6, wherein the docking hook comprises locking pins configured to passively couple to the exit latches in order to prevent the exit latches from opening, and to passively uncouple from the exit latches when the docking hook and coupled magnetic crawler are lowered to the cylindrical surface in order to allow the exit latches to passively open and release the magnetic crawler.

8. The UAV of claim 7, wherein the locking pins are further configured to passively re-couple to the exit latches in order to prevent the exit latches from opening after the magnetic crawler has been released.

9. The UAV of claim 6, wherein the magnetic crawler comprises a chassis and a docking adapter coupled to the chassis and configured to passively secure the chassis to the docking hook, the docking adapter including:
a docking knob configured to couple to the docking hook; and
a docking rod coupling the docking knob to the chassis, wherein the entry and exit latches are further configured to passively surround a section of the docking rod and remain passively shut during the coupling of the docking knob to the docking hook in order to passively secure the chassis to the docking hook.

10. The UAV of claim 1, wherein the magnetic crawler comprises an ultrasonic testing (UT) thickness sensor configured to nondestructively measure a thickness of the cylindrical surface after the deployment and before the retrieval.

11. The UAV of claim 1, wherein the cylindrical surface is part of a carbon steel pipe or vessel.

12. The UAV of claim 1, further comprising a control circuit coupled to the body and configured to control the linear actuator in order to control the lowering of the docking hook and coupled magnetic crawler to the cylindrical surface based on feedback from a deployment sensor.

13. A method of operating an unmanned aerial vehicle (UAV) comprising a body and a docking mechanism coupled to the body, the method comprising:
securing, by the docking mechanism, a magnetic crawler to the body during flight of the UAV and during landing of the UAV on a ferromagnetic cylindrical surface after the flight by coupling the magnetic crawler to a docking hook of the docking mechanism and coupling the docking hook to the body by a linear actuator of the docking mechanism;
deploying the magnetic crawler on the cylindrical surface after the landing by:
lowering, by the linear actuator, the docking hook and coupled magnetic crawler from the body to the cylindrical surface; and
passively releasing, by spring-loaded passive latches of the docking hook, the lowered magnetic crawler from the docking hook onto the cylindrical surface;
retrieving the magnetic crawler from the cylindrical surface after the deployment by:
passively receiving, by the spring-loaded passive latches, the magnetic crawler into the docking hook; and
raising, by the linear actuator, the docking hook and received magnetic crawler from the cylindrical surface to the body; and
passively securing, by the spring-loaded passive latches, the raised magnetic crawler to the body during takeoff of the UAV from the cylindrical surface after the retrieval.

14. The method of claim 13, wherein lowering the docking hook and coupled magnetic crawler comprises magnetically attaching the magnetic crawler to the cylindrical surface, and raising the docking hook and received magnetic crawler comprises magnetically detaching the magnetic crawler from the cylindrical surface.

15. The method of claim 13, wherein the magnetic crawler comprises a chassis and a docking adapter coupled to the chassis, the docking adapter comprises a docking knob and a docking rod coupling the docking knob to the chassis, and the method further comprises passively securing the chassis to the docking hook by coupling the docking knob to the docking hook while passively surrounding a section of the docking rod with the spring-loaded passive latches.

16. The method of claim 15, wherein the docking rod is off-centered with respect to a gravity direction of the center of mass of the chassis.

17. The method of claim 15, wherein the docking rod is cylindrical.

18. The method of claim 13, wherein:
the spring-loaded passive latches comprise entry latches on an entry side of the docking hook and exit latches on an exit side of the docking hook opposite the entry side;
passively receiving the magnetic crawler comprises passively opening the entry latches and receiving the magnetic crawler on the entry side during the retrieval and otherwise maintaining passive shutting of the entry latches; and
passively releasing the lowered magnetic crawler comprises passively opening the exit latches and releasing the magnetic crawler on the exit side during the deployment and otherwise maintaining passive shutting of the exit latches.

19. The method of claim 18, wherein:
the docking hook comprises locking pins;
the method further comprises preventing the exit latches from opening by passively coupling the locking pins to the exit latches; and
passively releasing the magnetic crawler comprises passively opening the exit latches and releasing the magnetic crawler by passively uncoupling the locking pins from the exit latches when the docking hook and coupled magnetic crawler are lowered to the cylindrical surface.

20. The method of claim 19, further comprising preventing the exit latches from opening after the magnetic crawler has been released by passively re-coupling the locking pins to the exit latches.

21. The method of claim 18, wherein the magnetic crawler comprises a chassis and a docking adapter coupled to the chassis, the docking adapter comprises a docking knob and a docking rod coupling the docking knob to the chassis, and the method further comprises passively securing the chassis to the docking hook by coupling the docking knob to the docking hook while passively surrounding a section of the docking rod with the entry and exit latches and maintaining the passive shutting of the entry and exit latches.

22. The method of claim 13, wherein the magnetic crawler comprises an ultrasonic testing (UT) thickness sensor, and the method further comprises nondestructively measuring, by the UT thickness sensor, a thickness of the cylindrical surface after the deployment and before the retrieval.

23. The method of claim 13, wherein the cylindrical surface is part of a carbon steel pipe or vessel.

24. The method of claim 13, wherein the UAV further comprises a control circuit coupled to the body, and the method further comprises controlling, by the control circuit, the linear actuator to control the lowering of the docking hook and coupled magnetic crawler based on feedback from a deployment sensor.

\* \* \* \* \*